(12) United States Patent
Kuntman et al.

(10) Patent No.: US 6,703,945 B2
(45) Date of Patent: Mar. 9, 2004

(54) SYSTEM AND METHOD FOR PREDICTING AND DISPLAYING WAKE VORTEX TURBULENCE

(75) Inventors: Daryal Kuntman, Bellevue, WA (US); Ruy C. P. Brandao, Redmond, WA (US); C. Don Bateman, Bellevue, WA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/935,558

(22) Filed: Aug. 22, 2001

(65) Prior Publication Data

US 2002/0075171 A1 Jun. 20, 2002

Related U.S. Application Data

(62) Division of application No. 09/564,599, filed on May 3, 2000.
(60) Provisional application No. 60/134,129, filed on May 14, 1999, provisional application No. 60/140,412, filed on Jun. 22, 1999, provisional application No. 60/116,715, filed on Jan. 21, 1999, provisional application No. 60/117,262, filed on Jan. 26, 1999, and provisional application No. 60/134,346, filed on May 14, 1999.

(51) Int. Cl.[7] ............................................... G08G 5/04
(52) U.S. Cl. ..................... 340/961; 340/949; 340/968; 342/26
(58) Field of Search ............................. 340/968, 963, 340/949, 961; 701/301, 9, 14, 120; 342/26, 29, 36, 30; 244/1 R

(56) References Cited

U.S. PATENT DOCUMENTS

| | | | | | |
|---|---|---|---|---|---|
| 5,724,040 | A | * | 3/1998 | Watnick | 342/36 |
| 5,845,874 | A | * | 12/1998 | Beasley | 244/1 R |
| 6,133,867 | A | * | 10/2000 | Eberwine et al. | 342/29 |
| 6,177,888 | B1 | * | 1/2001 | Cabot et al. | 340/968 |

* cited by examiner

Primary Examiner—Brent A. Swarthout
(74) Attorney, Agent, or Firm—Charles J. Rupnick

(57) ABSTRACT

A circuit and method for predicting an intersection of a host aircraft flight path with the wake vortex of another aircraft.

19 Claims, 18 Drawing Sheets

Fig. 1 *(PRIOR ART)*

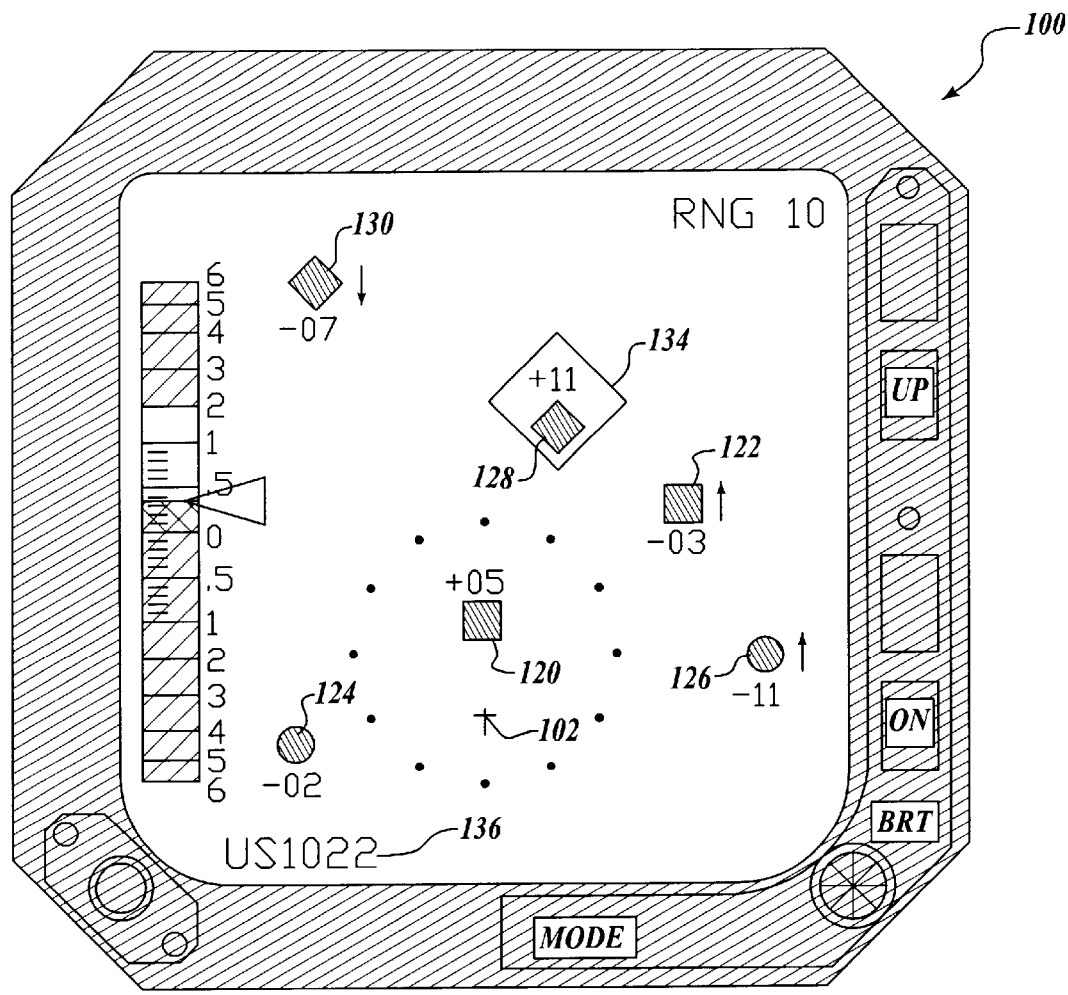
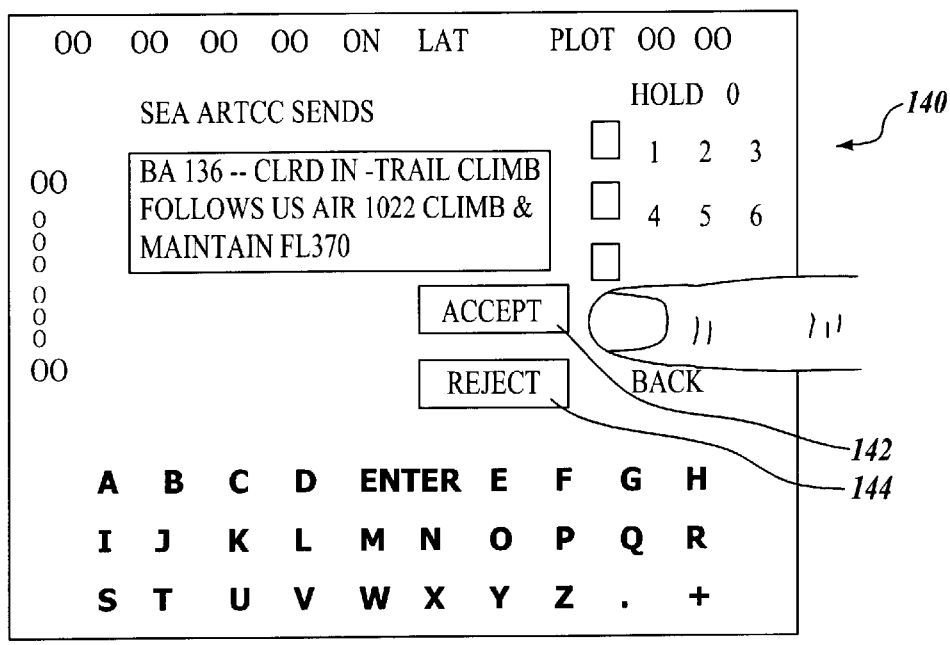
Fig. 5C

SYSTEM AND METHOD FOR PREDICTING AND DISPLAYING WAKE VORTEX TURBULENCE

This application is a divisional of and claims priority from U.S. application Ser. No. 09/564,599 filed on May 3, 2000, which in turn claims the benefit of U.S. Provisional Application Ser. No. 60/134,129, filed in the names of Daryal Kuntman and Ruy C. P. Brandao on May 14, 1999, the complete disclosure of which is incorporated herein by reference.

This application also claims the benefit of U.S. patent application Ser. No. 09/489,664, filed in the names of Thomas J. Staggs, Larry King, Daryl Brooke, Daryal Kuntman, and Ruy C. P. Brandao on Jan. 21, 2000, which in turn claims the benefit of U.S. Provisional Application Ser. No. 60/140,412, filed in the name of Thomas J. Staggs on Jun. 22, 1999; U.S. Provisional Application Ser. No. 60/134,129, filed in the names of Daryal Kuntman and Ruy C. P. Brandao on May 14, 1999; U.S. Provisional Application Ser. No. 60/116,715, filed in the names of Thomas J. Staggs, Larry King and Daryl Brooke on Jan. 21, 1999; and U.S. Provisional Application Ser. No. 60/117,262, filed in the names of Thomas J. Staggs, Larry King and Daryl Brooke on Jan. 26, 1999, and U.S. Provisional Application Ser. No. 60/134,346, filed in the name of Charles D. Bateman on May 14, 1999, the complete disclosures of which are incorporated herein by reference.

FIELD OF THE INVENTION

The present invention relates generally to aircraft collision avoidance systems, and particularly, to predicting the presence of wake vortex turbulence of air traffic and displaying the information on a Traffic Alert and Collision Avoidance System, or TCAS.

BACKGROUND OF THE INVENTION

Aircraft pilots are expected to visually identify collision threats and avoid them. This "see and avoid" technique based on the pilot's visual sense remains the most basic method of aircraft collision avoidance. However, since the 1950's electronic techniques based on radio frequency and optical transmissions have been developed to supplement the pilot's visual sense. The government has developed and implemented a system of ground based and aircraft carried equipment designated the Air Traffic Control Radar Beacon System (ATCRBS). This system includes two different types of ground based radar emitters located at each of a plurality of Air Traffic Control (ATC) stations. One type of radar is referred to as the Primary Surveillance Radar (PSR), or simply as the primary radar. The primary radar operates by sending out microwave energy that is reflected back by the aircraft's metallic surfaces. This reflected signal is received back at the ground radar site and displayed as location information for use by an air traffic controller. The second type of radar is referred to as the Secondary Surveillance Radar (SSR), or simply secondary radar. Unlike the primary radar, the SSR is a cooperative system in that it does not rely on reflected energy from the aircraft. Instead, the ground based SSR antenna transmits a coded 1030 MHz microwave interrogation signal. A transponder, i.e., a transmitter/receiver, carried on the aircraft receives and interprets the interrogation signal and transmits a 1090 MHz microwave reply signal back to the SSR ground site. This receive and reply capability greatly increases the surveillance range of the radar and enables an aircraft identification function, referred to as Mode-A, wherein the aircraft transponder includes an identification code as part of its reply signal. This identification code causes the aircraft's image or blip on the ATC operator's radar screen to stand out from the other targets for a short time. Thus, Mode-A provides an rudimentary identification function.

In addition to the identification function provided by Mode-A, the aircraft altimeter is typically coupled to the transponder such that a reply signal includes altitude information, referred to as Mode-C.

A ground based SSR sequentially transmits both Mode-A and Mode-C interrogation signals to aircraft in the area. Accordingly, the interrogation signal transmitted by the SSR contains three pulses. The second pulse is a side-lobe suppression signal transmitted from an omnidirectional antenna co-located with a mechanically rotating antenna which provides a highly directive antenna beam. The first and third pulses are transmitted by the directive antenna at a predetermined frequency and are separated by a predetermined interval. The time interval between the first and third pulses defines what information the interrogator is requesting: eight (8) microseconds for identification and twenty-one (21) microseconds for altitude. The operator of the ground based SSR sets the radar interrogation code to request either Mode-A or Mode-C replies from the aircraft transponder. Typically, the radar is set to request a sequence of two Mode-A replies followed by a single Mode-C reply. This sequence is repeated so that a radar operator continuously receives both the Mode-A identification code and the Mode-C altitude information. Upon receipt of the interrogation signal, the aircraft transponder develops and transmits a reply signal which includes the identification or altitude information. The ground based SSR receives and processes the transponder reply signal, together with time of arrival range information, to develop a measurement of position for each responding aircraft. Under such a system, the air traffic controller uses this information to involve the aircraft by radio, usually with voice communication, to maintain or restore safe separations between aircraft. The system is inherently limited because each aircraft needs be dealt with individually, which requires a share of the air traffic controller's time and attention. When traffic is heavy, or visibility is low, collision potential increases.

During the 1960's the increases in the number of aircraft, the percentage of aircraft equipped with transponders, and the number of ATCRBS radar installations began to overload the ATCRBS system. This system overload caused a significant amount of interference and garble in the Mode-A and Mode-C transmissions because of replies from many simultaneously interrogated aircraft. Furthermore, the Mode-A and Mode-C systems are unable to relay additional information or messages between the ground based SSR and the interrogated aircraft, other than the aforementioned identification and altitude information. The Mode Select, or Mode-S, was the response to this overload and other deficiencies in ATCRBS. Mode-S is a combined secondary surveillance radar and a ground-air-ground data link system which provides aircraft surveillance and communication necessary to support automated ATC in the dense air traffic environments of today.

Mode-S incorporates various techniques for substantially reducing transmission interference and provides active transmission of messages or additional information by the ground based SSR. The Mode-S sensor includes all the essential features of ATCRBS, and additionally includes individually timed and addressed interrogations to Mode-S transponders carried by aircraft. Additionally, the ground based rotating directive antenna is of monopulse design which improves position determination of ATCRBS target aircraft while reducing the number of required interrogations and responses, thereby improving the radio frequency (RF) interference environment. Mode-S is capable of common channel interoperation with the ATC beacon system. The Mode-S system uses the same frequencies for interrogations and replies as the ATCRBS. Furthermore, the waveforms, or modulation techniques, used in the Mode-S interrogation signal were chosen such that, with proper demodulation, the information content is detectable in the presence of overlaid ATCRBS signals and the modulation of the downlink or reply transmission from the transponder is pulse position modulation (PPM) which is inherently resistant to ATCRBS random pulses. Thus, the Mode-S system allows full surveillance in an integrated ATCRBS/Mode-S environment.

The Radio Technical Commission for Aeronautics (RTCA) has promulgated a specification for the Mode-S system, RTCA/DO-181A, MINIMUM OPERATIONAL PERFORMANCE STANDARDS FOR AIR TRAFFIC CONTROL RADAR BEACON SYSTEM/MODE SELECT (ATCRBS/MODE-S) AIRBORNE EQUIPMENT, issued January 1992, and incorporated herein by reference. According to RTCA specification DO-181, the airborne portion of the Mode-S system includes in one form or another at least a dedicated transponder, a cockpit mounted control panel, two dedicated antennas and cables interconnecting the other elements. As discussed more fully below, each aircraft may be within range of more than one SSR ground station at any time and must respond to interrogation signals broadcast from multiple directions. Therefore, the Mode-S system typically uses two single element omnidirectional antennas to receive interrogation signals from any quadrant and reply in kind.

In operation, a unique 24-bit address code, or identity tag, is assigned to each aircraft in a surveillance area by one of two techniques. One technique is a Mode-S "squitter" preformed by the airborne transponder. Once per second, the Mode-S transponder spontaneously and pseudo-randomly transmits, or "squitters," an unsolicited broadcast, including a specific address code unique to the aircraft carrying the transponder, via first one and then the other of its antennas which produce an omnidirectional pattern. The transponder's transmit and receive modes are mutually exclusive to avoid damage to the equipment. Whenever the Mode-S transponder is not broadcasting, it is monitoring, or "listening," for transmissions simultaneously on its omnidirectional antennas. According to the second technique, each ground based Mode-S interrogator broadcasts an ATCRBS/Mode-S "All-Call" interrogation signal which has a waveform that can be understood by both ATCRBS and Mode-S transponders. When an aircraft equipped with a standard ATCRBS transponder enters the airspace served by an ATC Mode-S interrogator, the transponder responds the with a standard ATCRBS reply format, while the transponder of a Mode-S equipped aircraft replies with a Mode-S format that includes a unique 24-bit address code, or identity tag. This address, together with the aircraft's range and azimuth location, is entered into a file, commonly known as putting the aircraft on roll-call, and the aircraft is thereafter discretely addressed. The aircraft is tracked by the ATC interrogator throughout its assigned airspace and, during subsequent interrogations, the Mode-S transponder reports in its replies either its altitude or its ATCRBS 4096 code, depending upon the type of discrete interrogation received. As the Mode-S equipped aircraft moves from the airspace served by one ATC Mode-S interrogator into that airspace served by another Mode-S interrogator, the aircraft's location information and discrete address code are passed on via landlines, else either the ground based SSR station picks up the Mode-S transponder's "squitter" or the Mode-S transponder responds to the All-Call interrogation signal broadcast by the next ATC Mode-S interrogator.

The unique 24-bit address code, or identity tag, assigned to each aircraft is the primary difference between the Mode-S system and ATCRBS. The unique 24-bit address code allows a very large number of aircraft to operate in the air traffic control environment without an occurrence of redundant address codes. Parity check bits overlaid on the address code assure that a message is accepted only by the intended aircraft. Thus, interrogations are directed to a particular aircraft using this unique address code and the replies are unambiguously identified. The unique address coded into each interrogation and reply also permits inclusion of data link messages to and/or from a particular aircraft. To date, these data link messages are limited to coordination messages between TCAS equipped aircraft, as discussed below. In future, these data link messages are expected to include Aircraft Operational Command (AOC) information consisting of two to three pages of text data with flight arrival information, such as gates, passenger lists, meals on board, and similar information, as well as Flight Critical Data (FCD). However, the primary function of Mode-S is surveillance and the primary purpose of surveillance remains collision avoidance.

Collision avoidance systems which depend on aircraft carried transponders are usually divided into two classes: passive and active. The ATCRBS, including Mode-S, described above are passive systems because the transponder reply emissions alone provide the only information for locating and identifying potential threats. While passive systems tend to be simple and low cost when compared to active systems and do not crowd the spectrum with additional RF transmissions, detection of transponder emissions from other aircraft is difficult. A passive collision threat detector is essentially a receiver having sufficient intelligence to first detect and then locate the existence of potential collision threats represented by nearby aircraft. The aircraft's receiver is of necessity operating in close proximity to the host aircraft's ATCRBS transponder. Government regulations require the ATCRBS transponder to emit RF energy at 125–500 watts in response to interrogation signals from a ground based SSR. The transponder aboard any potential collision threat aircraft flying along a radial from the directional SSR antenna, usually about 3° to 4° wide, will respond at about the same time as the host aircraft's transponder. The host aircraft's transponder is so much closer, usually no more than a few feet, to any receiver that the host aircraft's own response to the interrogation signal will swamp the response from any other aircraft in its vicinity. Thus, the host aircraft flies in a "blind" region wherein any potential threat aircraft is not "seen," unless other provisions are made. This blind region expands as the target approaches the host. Furthermore, typically each aircraft is within range of more than one SSR site and a blind region is associated with each SSR site. Because wholly passive systems are generally believed insufficient for reliable collision avoidance, the government and aviation industry have cooperated in developing Operational Performance Standards for a Traffic Alert and Collision Avoidance System, known as TCAS, separate from the ATCRBS/Mode-S transponder system. The standards are set forth in the RTCA specifications DO-185, MINIMUM OPERATIONAL PERFORMANCE STANDARDS FOR AIR TRAFFIC ALERT AND COLLISION AVOIDANCE SYSTEM (TCAS) AIRBORNE EQUIPMENT, issued Sep. 23, 1983, consolidated Sep. 6, 1990, and DO-185A, MINIMUM OPERATIONAL PERFORMANCE STANDARDS FOR AIR TRAFFIC ALERT AND COLLISION AVOIDANCE SYSTEM II (TCAS II) AIRBORNE EQUIPMENT, issued December 1997, both of which are incorporated herein by reference.

FIG. 1 illustrates one known embodiment of the TCAS 1 having 4-element interferometer antennas 2A and 2B coupled to a radio frequency receiver 3 of a TCAS processor 4. Receiver 3 is coupled in turn to a signal processor 5 operating known traffic alert and collision avoidance software. A radio frequency transmitter 6 is coupled to signal processor 5 for broadcasting Mode-S interrogation signals. An associated control panel 7 for operating TCAS 1 and display 8 for displaying TCAS information are each coupled to signal processor 5 of TCAS processor 4, as described in each of U.S. Pat. No. 4,855,748 entitled, TCAS BEARING ESTIMATION RECEIVER USING A 4 ELEMENT ANTENNA, issued on Aug. 8, 1989, to Ruy L. Brandao et al and U.S. patent application Ser. No. 09/369,752 entitled, MULTIFUNCTIONAL AIRCRAFT TRANSPONDER, filed on Aug. 6, 1999, in the names of Daryal Kuntman, Ruy L. Brandao, and Ruy C. P. Brandao, the complete disclosures of which are incorporated herein by reference. TCAS is a well-known active collision avoidance system that relies upon reply signals from airborne transponders in response to interrogation signals from an aircraft equipped with an ATCRBS Mode-A/Mode-C or Mode-S transponder. The TCAS antenna is driven to produce a directional microwave transmission, or radiation, pattern carrying a transponder generated coded interrogation signal at 1030 MHz, the same frequency used by ground based SSR stations to interrogate Mode-S transponders. Whenever the TCAS transponder is not broadcasting, it is "listening" for Mode-S "squitters" and reply transmissions at 1090 MHz, the same frequency used by Mode-S transponders to reply to interrogation signals. Thus, a TCAS equipped aircraft can "see" other aircraft carrying a transponder. Once a transponder equipped target has been "seen," the target is tracked and the threat potential is determined by operation of known TCAS algorithms, as described in each of U.S. Pat. No. 5,077,673, AIRCRAFT TRAFFIC ALERT AND COLLISION AVOIDANCE DEVICE, issued Dec. 31, 1991, and U.S. Pat. No. 5,248,968, TCAS II PITCH GUIDANCE CONTROL. LAW AND DISPLAY SYMBOL, issued Sep. 28, 1993, the complete disclosures of which are incorporated herein by reference. Altitude information is essential in determining a target's threat potential. As described in incorporated U.S. Pat. Nos. 5,077,673, and 5,248,968, comparison between the altitude information encoded in the reply transmission from the threat aircraft and the host aircraft's altimeter is made in the TCAS processor and the pilot is directed obtain a safe altitude separation, by descending, ascending or maintaining current altitude.

Collision avoidance is enhanced by including range information during threat determination. The approximate range, or distance between the host aircraft and the target, is based on the strength of the received transponder signal in response to an interrogation signal from the host aircraft. Modem TCAS systems obtain more accurate range information by measuring the time lapse between transmission of the interrogation signal and reception of the reply signal, commonly known as "turn around time." The time to closest approach as determined by the TCAS processor is the primary consideration in threat determination.

Knowledge of the direction, or bearing, of the target aircraft relative to the host aircraft's heading greatly enhances a pilot's ability to visually acquire the threat aircraft and provides a better spatial perspective of the threat aircraft relative to the host aircraft. The TCAS processor can display bearing information if it is available. Bearing information is also used by the TCAS processor to better determine threat potential presented by an intruder aircraft. Directional antennas are used in some TCAS systems for determining angle of arrival data which is converted into relative bearing to a threat aircraft by the TCAS processor. Several methods exist for determining angle of arrival data. One common arrangement uses a phase matched quadrapole antenna array with output signals being combined such that the phase difference between two output ports of the combining circuitry indicates the bearing of a received transponder signal. Another method for determining angle of arrival data includes a method based on signal phase, commonly known as phase interferometry. Still another commonly known method is based on signal amplitude. Attenuation of the received transponder signals by the airframe blocking the antenna from the transmitter is often overcome by locating a primary directional antenna on a top surface of the aircraft and a second antenna on a bottom surface of the aircraft. The second or bottom antenna is sometimes omnidirectional which reduces cost at the expense of reduced directional coverage. Other TCAS systems provide duplicate directional antennas top and bottom. U.S. Pat. No. 5,552,788, ANTENNA ARRANGEMENT AND AIRCRAFT COLLISION AVOIDANCE SYSTEM, issued Sep. 3, 1996, the complete disclosure of which is incorporated herein by reference, teaches an arrangement of four standard monopole antenna elements, for example, ¼ wavelength transponder antennas, arranged on opposing surfaces of one axis of the aircraft at the extremes of two mutually orthogonal axes to avoid shadowing and provide directional information about the received reply signal. For example, two monopole antennas are preferably mounted on a longitudinal axis of the aircraft and two additional monopole antennas are preferably mounted on a lateral axis of the aircraft orthogonal to the longitudinal axis passing through the first two antennas. Directionality is determined by comparing the power levels of the received signals. Additionally, U.S. Pat. No. 5,552,788 teaches a TCAS system which can transmit transponder interrogation signals directionally using predetermined ones of the monopole antennas, thus eliminating dependence upon ground based radar systems for interrogating threat aircraft transponders.

Other antennas for directionally transmitting TCAS system transponder interrogation signals are also commercially available. For example, a TCAS system-compatible directional antenna is commercially available from Honeywell, Incorporated of Redmond, Wash., under the part number ANT 81A.

The ATCRBS/Mode-S surveillance system and the TCAS collision avoidance system are generally separate, the algorithms operated by the TCAS processor account for the data provided by the intruder aircraft to determine what evasive maneuver to recommend to the host aircraft's pilot, i.e., whether to recommend that the pilot maintain current altitude, ascend or descend. The TCAS system also uses the inter-aircraft data link provided by the addressable Mode-S transponder to coordinate the recommended evasive maneuver with a TCAS equipped intruder aircraft. Furthermore, a connection between the TCAS and Mode-S transponders and other avionics on an aircraft allows coordination between the TCAS and Mode-S transponders.

The TCAS is also coupled to provide an output signal to one or more displays as described in above incorporated U.S. patent application Ser. No. 09/369,752. The function of the display is described in detail in connection with FIG. 2.

FIG. 2 shows one configuration of a conventional display 10 used with a TCAS collision avoidance system. Display 10 includes an aircraft symbol 12 to depict the position of the host aircraft. A circle, formed by multiple dots 14 surrounding host aircraft position symbol 12, indicates a 2 nautical mile range from the host aircraft. Generally, semi circular indicia 16 around the periphery of indicator display 10 and a rotatable pointer 18 together provide an indication of the rate of change of altitude of the host aircraft. Indicia 16 are typically marked in hundreds of feet per minute. The portion of indicia 16 above the inscriptions "0" and "6" indicates rate of ascent while the portion below indicates rate of descent.

Other target aircraft or "intruders" are identified on display 10 by indicia or "tags" 20, 22 and 24. Tags 20, 22, 24 are shaped as circles, diamonds or squares and are color coded (not shown) to provide additional information. Square 20 colored red represents an intruder entering warning zone and suggests an immediate threat to the host aircraft with prompt action being required to avoid the intruder. Circle 22 colored amber represents an intruder entering caution zone and suggests a moderate threat to the host aircraft recommending preparation for intruder avoidance. Diamond 24 represents near or "proximate traffic" when colored solid blue or white and represents more remote traffic or "other traffic" when represented as an open blue or white diamond. Air traffic represented by either solid or open diamond 24 is "on file" and being tracked by the TCAS.

Each indicia or tag 20, 22, 24 is accompanied by a two digit number preceded by a plus or minus sign. In the illustration of FIG. 2 for example, a "+05" is adjacent circle tag 20, a "−03" is adjacent square tag 22 and a "−12" is adjacent diamond tag 24. Each tag may also have an vertical arrow pointing either up or down relative to the display. The two digit number represents the relative altitude difference between the host aircraft and the intruder aircraft, the plus and minus signs indicating whether the intruder is above or below the host aircraft. Additionally, the two digit number appears positioned above or below the associated tag to provide a visual cue as to the intruder aircraft's relative position: the number positioned above the tag indicates that the intruder is above the host aircraft and the number positioned below the tag indicates that the intruder is below the host aircraft. The associated vertical arrow indicates the intruder aircraft's altitude is changing at a rate in excess of 500 feet per minute in the direction the arrow is pointing. The absence of an arrow indicates that the intruder is not changing altitude at a rate greater than 500 feet per minute.

Display 10 includes several areas represented by rectangular boxes 26, 28, 30, 32, 34 which are areas reserved for word displays wherein conditions of the TCAS are reported to the pilot of the host aircraft. For example, if a portion or component of the TCAS fails, a concise textual report describing the failure appears in one of rectangular boxes 26, 28, 30, 32, 34. In another example, if the operator operates mode control 36 to select one of a limited number of operational modes, a concise textual message indicating the choice of operational mode appears in another of rectangular boxes 26, 28, 30, 32, 34. Selectable operational modes typically include a "standby" mode in which both of the host aircraft transponder systems are inactive, a "transponder on" mode in which a selected one of primary transponder and secondary transponder is active, a "traffic alert" mode in which an alert is transmitted to the host aircraft pilot if any Mode-C or Mode-S transponder equipped aircraft are entering a first predetermined cautionary envelope of airspace, and a "traffic alert/resolution advisory" mode in which a traffic alert (TA) and/or resolution advisory (RA) is issued if any Mode-C or Mode-S transponder equipped aircraft are entering a second predetermined warning envelope of airspace. The various operational modes described above are selectable by operating mode control 36.

The Vertical Speed Indicator (VSI) portion of indicator display 10, formed by the semi circular indicia 16 around the periphery and rotatable pointer 18, are used in the TCAS to indicate a rate of climb or descent that will maintain the safety of the host aircraft. In the particular example of FIG. 2, a colored arc portion 40, referenced by double cross-hatching, of the VSI scale indicates a recommended rate of climb intended to ensure the safety of the host aircraft. Another colored arc portion 42, referenced by single cross-hatching, of the VSI scale indicates a rate of descent which the TCAS recommends against for the host aircraft in the current situation. The operator of the intruder aircraft receives instructions coordinated with the host aircraft TCAS.

Present visual flight displays fail to include accurate information regarding on board detection and display of accurate wake vortex information of air traffic. Thus, aircrews are not currently shown the location nor intensity of wake vortices created by other planes. This lack of information represents a significant aviation hazard that could result in injuries to passengers and crew, or, potentially, damage and loss of the airplane. Wake vortex turbulence during landing approach poses commercial penalties as spacing requirement at airports have been adjusted farther than otherwise necessary. This increased spacing results in fewer landings for many operators. In other words, in the absence of better information, the FAA has leaned on the side of caution and imposed certain spacing rules which on average are more than is required for safe separation in the presence of wake vortex turbulence. Some operators must conduct extensive overhaul and inspection of aircraft, which have experienced uncommanded roll and pitch to insure that the aircraft equipment is not at fault. In many cases the cause is wake vortex turbulence. However, since operators cannot demonstrate that wake vortex turbulence is the cause they sometimes remove aircraft from operation for up to two days, thus incurring significant and potentially unnecessary financial penalty.

The pilots of modern aircraft have on-board radar systems capable of detecting large areas of turbulence such as windshear. This turbulence is usually depicted as radar lines or "waves" to indicate that an area or turbulence has been detected. Wake vortices, however, are not currently detectable by on-board systems, with the exception of some experimental trials having very short detection and warning ranges, on the order of less than 30 seconds' warning distance. Currently, no system exists for predicting and detecting this type of turbulence at longer ranges or to depict the location and/or intensity of another aircraft's wake vortex in a manner such that the pilots can maneuver to avoid its dangerous effects.

Parallel approaches are another problem area which is not adequately addressed in the prior art. At present no method or device in known to the inventors that provides a visual display of other aircraft encroaching on the flight path of the host aircraft during simultaneous approach on parallel runways. Instrument Landing System (ILS), the system that provides lateral, along-course, and vertical guidance to aircraft attempting to land, is inadequate to the task of maintaining separation during landing because the displayed localizer signal on the ILS approach does not support independent parallel approaches. As shown in FIG. 3, the overlap 50, represented by cross-hatching, between localizer paths 52A and 52B to parallel runways 54A and 54B, respectively, shows that even strict adherence to the ILS signal by both pilots can result in intersecting flight paths. The problem is particularly acute at airports with closely spaced parallel runways. Although parallel approaches may be adequately staggered in fair weather and the ILS is intended to maintain an adequate vertical separation between aircraft until an approach is established, bad weather decreases airport capacity and compounds the problems of parallel approaches. For example, Mode-S Specific Protocol (MSP) arrival rates may double from 30 arrivals per to hour during fair weather to 60arrivals per hour during nominally cloudy conditions, in part because airlines schedule flights as if every day is fair weather.

NASA (Langley) modified the traffic alerting algorithms known as Airborne Information for Lateral Spacing (AILS) algorithms, which are incorporated herein by reference. The NASA modified AILS algorithms added a vertical dimension, modified protected zones from circles to ellipses for added safety, and changed to using actual states once the aircraft moves off intended path. Three alert types: 1) navigation performance (navigation alert); 2) host ship threat to adjacent ship (path alert); and 3) adjacent ship threat to host ship (traffic alert), and two alert levels: 1) Caution (yellow) for situational awareness; and 2) Warning (red) for performing an emergency escape maneuver, are used. However, to date no visual simulation has been available to pilots for quick and easy assessment of the traffic situation during parallel approaches.

As discussed in Amy R. Pritchett's paper Pilot Situation Awareness And Alerting System Commands, copyright 1998 by Society of Automotive Engineers, Inc., the complete text of which is incorporated herein by reference, two commonly stated objectives of modern cockpit systems are improving pilot situation awareness and adding the safety benefits of sophisticated alerting and command generation functions. Pritchett's paper concludes that expected gains in safety are not realized if these two functions appear to provide conflicting or dissonant information to the pilot.

The TCAS and Mode-S sensor and datalink technologies described above enable displays to provide information both internal and external to the aircraft. Such enhancements to pilot situation awareness are normally expected to provide the pilot with better situation awareness which should serve as a basis for more accurate decisions. However, TCAS is intended to fulfill an "executive" role wherein the system is provided with automatic means to assess hazards, evaluate if an alert is required to cue an action, and decide upon evasive maneuvers to prevent or resolve the hazardous condition with the implicit assumption that the pilot quickly and precisely executes the commands.

However, studies indicate that the pilot situation awareness and executive alerting systems are often perceived by pilots to provide conflicting or dissonant information with the result that pilots do not always automatically execute the evasive maneuver recommended by the TCAS. Rather, pilots actively evaluate the situation based on information available to them through traffic situation displays and other sources, such as visual acquisition and air traffic control communications, to independently determine avoidance maneuvers. Pritchett's studies examined the effects of TCAS situation displays and automatic executive alerts on pilot reactions to potential collisions generally, and during parallel approaches particularly, and identified both a high rate of nonconformance to TCAS commands and an interaction between nonconformance and TCAS traffic situation displays.

Pritchett's paper suggests that either the TCAS commands could become mandatory while any conflicting information is deleted from the display, or alternatively, the TCAS commands could provide pilots with higher levels of situation awareness, which increases pilots' ability to understand and verify the alerting logic and encourages pilots to use better decision making strategies. Pritchett concludes that pilots may perceive that the TCAS may not include all relevant information in its decision making, which promotes a lack confidence in the TCAS and a felt need to evaluate the situation and reconcile their decisions with the TCAS commands. Furthermore, pilots' evaluation of the TCAS commands can significantly and unexpectedly delays their reaction. Additionally, inconsistencies between pilots' decisions and the TCAS commands may cause pilots to execute different than expected responses to the hazard. Increasing pilots' ability to understand and verify the alerting system's logic may increase pilots' trust to the extent that pilots do not feel a need to confirm or ignore the TCAS commands.

Although studies such as the above incorporated Pritchett paper suggest the need to present pilots with highly processed information required for the desired solution algorithms, and to display the objective functions operated by the alerting system in considering this information to promote pilot conformance to the commands, no currently operating TCAS system provides such information. Furthermore, the air traffic industry in general needs such information as RSVM in general, and in particularly needs visual simulations of relevant TCAS information for flying parallel approaches, during in-trail climbs, and for minimizing risk from wake vortices. Parent application Ser. No. 09/489,664 (Attorney Docket No. 543-99-010) satisfies the need to display visual simulations of such relevant TCAS information.

TCAS represents one known system exist for predicting airborne collisions. Other predictive systems are also known. For example, U.S. Pat. No. 5,325,302, entitled GPS-BASED ANTI-COLLISION WARNING SYSTEM, issued to Izidon, et al on Jun. 28, 1994, the complete disclosure of which is incorporated herein by reference, describes a method for predicting a collision between two or more relatively moving aircraft, including determining a respective position in space for each one of the aircraft relative to a fixed frame of reference at a predetermined frequency to produce successive frames of positional data for each aircraft with a coupled memory for storing the successive positional data frames, computing a trajectory for each aircraft relative to the fixed frame of reference, and predicting whether two or more trajectories will intersect.

However, while TCAS and other ways to predict collisions are known, none predict intruder aircraft wake vortex information, such as intensity, location, elevation or drift. Nor do such known collision prediction systems predict the host aircraft colliding with an intruder's wake vortex. Thus, what is needed is a method for predicting intruder wake vortex information relative to the host aircraft.

SUMMARY OF THE INVENTION

The present invention overcomes the limitations of the prior art by providing a method and device for predicting intruder wake vortex information relative to the host aircraft. Preferably, predicted intruder wake vortex information is displayed using an air traffic alert and collision avoidance system (TCAS) display. The method and circuit of the present invention provide synthesized information to pilots by directly presenting information required for higher levels of situation awareness and decision making criteria used by the alerting system to pilots, whereby pilots are able to understand the basis for automatic commands.

The method of the present invention is a method for predicting the intensity and location of a wake vortex relative to a host aircraft resulting from a proximate intruder aircraft. The method of the invention includes determining a location of an intruder aircraft relative to the host aircraft; and determining information describing the wake vortex formed by the intruder. Preferably, the method of determining the wake vortex description includes determining the intruder aircraft type and configuration and determining local atmospheric conditions.

According to one aspect of the invention, the local atmospheric information determined and used by the invention includes one or more of the wind speed, the wind direction, and the local air temperature.

According to another aspect of the invention, the determination of the configuration of the intruder aircraft includes determining the position and altitude of the intruder aircraft relative to a local airport runway. Preferably, determining the altitude of the intruder aircraft relative to the local airport runway includes determining the barometric altitude of the intruder aircraft and determining terrain elevation information corresponding to the intruder's position. The intruder's barometric altitude is determined, for example, by retrieving Mode-C information from the intruder. The intruder's position relative to a local airport is determined, for example, by comparing the intruder's absolute position with a stored database of airport information. Various methods are known for determining the intruder's absolute position. These various known methods, some of which are described in detail herein as examples, are all contemplated by the invention and are intended to be contained within the scope of the claimed invention.

According to still another aspect of the invention, the wake vortex of the intruder aircraft is determined as a function of: the intruder aircraft type information, including weight class; the intruder's elevation and configuration; and local atmospheric conditions. According to one method of the invention, the intruder aircraft type, configuration, and local atmospheric conditions are used to access a look-up table of wake vortex information. According to an alternative method of the invention, the information is used to operate a model of wake vortex information.

According to yet another aspect of the invention, the probable strength and/or location of the wake vortex are determined as a function the intruder aircraft type, configuration, and local atmospheric conditions. According to various aspects of the invention, the strength and location information are determined by using the intruder aircraft type and configuration along with local atmospheric conditions to access a look-up table of wake vortex information. According to an alternative method, the invention uses the information to operate a model of wake vortex information.

Preferably, the invention includes displaying the wake vortex information. The wake vortex information is displayed, for example, on the TCAS display using the visual symbology described herein.

According to one aspect of the invention, the trajectory or flight path of the host aircraft is compared to the predictions of the wake vortex to determine whether continuation on the present flight path will cause the host aircraft to intersect or collide with the intruder's wake vortex. Preferably, the invention generates an alert if an intersection or collision is predicted. The alert is any of a visual and/or aural alert. A visual alert is preferably displayed on the TCAS display. An aural alert is generated in meaningful and unambiguous terms.

According to still another aspect of the invention, the wake vortex information is recorded, for example, using a nonvolatile memory coupled to the circuit operating the algorithm of the invention.

The method of the present invention includes configuring a TCAS display of a host aircraft to display an icon representing another aircraft within a predetermined range; delineate the icon; and display a visual symbol describing a relative velocity of the other aircraft.

According to one aspect of the invention, delineating the icon includes delineating one of one or more icons representing different aircraft within the predetermined range in response to a selection input by the operator or pilot. The method of delineating the icon includes any of forming a wireline-type delineator around the selected icon, flashing or "blinking" the selected icon alternately on and off; changing the color of the selected icon, and changing the shape of the selected icon.

According to another aspect of the invention, the method of displaying a visual symbol describing a relative velocity of the other aircraft includes displaying a visual symbol indicative of a relative velocity having a value greater than a predetermined threshold value. Furthermore, the method includes displaying a relative heading of the other aircraft and a different visual symbol indicative of a relative velocity having a value less than said predetermined threshold value.

According to other aspects of the invention, the invention includes displaying a visual symbol descriptive of the wake vortex created by the other aircraft. This visual symbol also preferably indicates the orientation of the wake vortex by any of aligning the visual symbol with the relative heading of the other aircraft, aligning the visual symbol with an average position of the wake vortex, and aligning the visual symbol with the path of the wake vortex.

According to other aspects of the invention, the invention includes displaying a visual symbol describing the intensity of the wake vortex, or alternatively, describing the intensity of the wake vortex in combination with information describing the orientation of the wake vortex. The visual symbol describing the intensity of the wake vortex describes either the speed of the other aircraft, or the geographic length of the wake vortex.

According to still another aspect of the invention, the invention includes displaying a textual message including flight identification of the other aircraft.

According to yet another aspect of the invention, the invention includes displaying a visual symbol defining a zone of "protected" airspace between the host aircraft and the icon-represented aircraft during a parallel approach. Preferably, the invention identifies a probable incursion of the protected airspace which will occur within a predetermined time period. Furthermore, the invention also preferably displays a visual symbol identifying an actual incursion of the protected airspace.

According to still other aspects of the invention, the invention provides an advanced TCAS display embodying one or more of the methods of the invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5C illustrates another method of the present invention for selecting an aircraft to determine flight identification in which the operator selects the desired aircraft by means of a datalink, whereby the Mode-S identifier is uploaded or the identification is made by direct controller designation, and the operator accepts or rejects the delineated icon to select the desired aircraft by operating accept/reject controls;

DETAILED DESCRIPTION OF PREFERRED EMBODIMENT

In the Figures, like numerals indicate like elements.

The present invention is a method for displaying advanced TCAS information and a device embodying the method.

Figure 4:
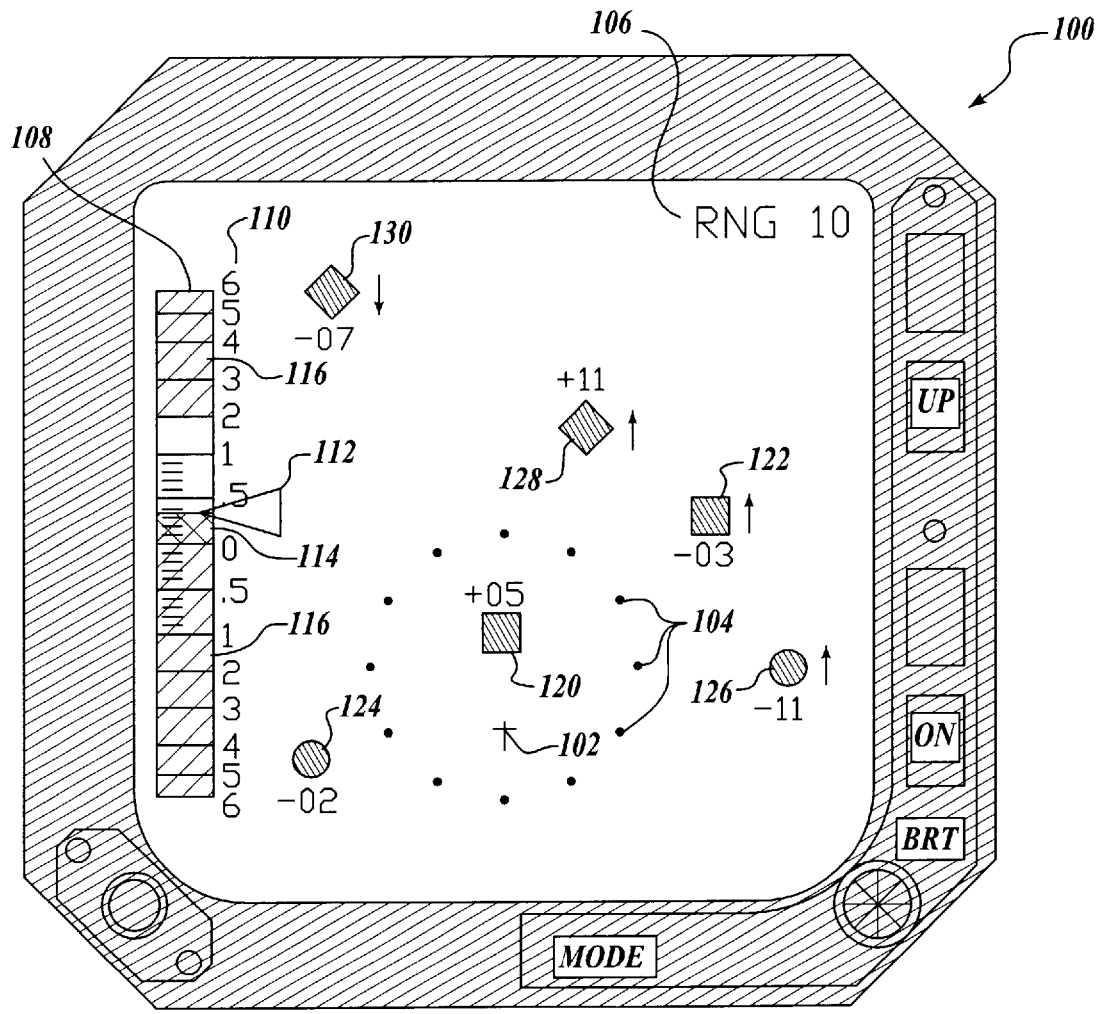
FIG. 4 illustrates a TCAS display of the present invention in a traffic advisory/vertical speed indicator having a vertical tape vertical speed indicator.

FIG. 4 illustrates a TCAS display of the present invention in a traffic advisory/vertical speed indicator having a vertical tape vertical speed indicator. TCAS display 100 of FIG. 4 includes an aircraft symbol 102 to depict the position of the host aircraft. A circle, formed by multiple dots 104 surrounding host aircraft position symbol 102, indicates a radial range boundary around the host aircraft, for example, the circle of multiple dots 104 indicates a 2 nautical mile range from the host aircraft. A range display indicator 106 appears on the screen as a text message and indicates the maximum range displayed, thereby providing a scale for interpreting the displayed information. Preferably, the range is manually adjustable within the limitations of the TCAS sensing equipment. Range display indicator 106 is preferably provided in a shorthand text format as shown. In TCAS display 100 of the invention, the circular format of indicia 16, indicating vertical speed in hundreds of feet per minute with indicia 16 above and below the horizontal bisector respectively indicating rate of ascent and rate of descent, is replaced by tape or bar formatted vertical speed indicator 108. Tape vertical speed indicator 108 includes linear indicia 110 indicating vertical speed in hundreds of feet per minute. Indicia 110 above a horizontal midpoint indicate rate of ascent while indicia 110 below indicate rate of rate of descent. Generally, tape formatted indicia 110 and an indicator 112, such as the arrowhead depicted, pointing at indicia 110 together provide an indication of the rate of change of altitude of the host aircraft. Tape formatted vertical speed indicator 108 brings human factors into accord with most Electronic Flight Instrument Systems (EFIS) and provides for display of other aircraft farther in front and behind the host aircraft for a given scale and screen size. Those of ordinary skill in the art will recognize that other embodiments than that illustrated in FIG. 4 are possible and are intended to lie within the scope of the invention. For example, vertical tape formatted indicia 110 and an indicator 112 are equally effective in achieving the goals of the invention when configured to appear on the opposite side of the screen of display 100, changing positions with range display indicator 106. According to other alternative embodiments, tape formatted indicia 110 and an indicator 112 are formatted to appears horizontally along either the top or bottom of the screen. Other appearances of tape formatted indicia 110 and an indicator 112, different from the illustration in FIG. 4 are also contemplated by the invention, such as dots replacing the line marks of tape formatted indicia 110 and alternative appearances of indicator 112 than that of an arrowhead. All such alternative embodiment are both contemplated by the invention and intended to lie within the scope of the invention. Furthermore, the visual symbology of the invention includes a TCAS recommended climb or descent rate for the host aircraft in event of a traffic alert. In FIG. 4, a TCAS recommended climb rate intended to ensure the safety of the host aircraft is indicated on tape formatted vertical speed indicator 108 by providing a zone 114, referenced by double cross-hatching, illuminated in a first color (not shown) such as green as is used in the prior art. Another zone 116, referenced by single cross-hatching, of linear VSI scale 108 indicates a rate of descent which the TCAS recommends against for the host aircraft in the current situation. This second zone 116 is illuminated in a second color (not shown) different from the first color of zone 114 such as red, which is used in the prior art. The operator of the intruder aircraft receives instructions coordinated with the host aircraft TCAS. Other target aircraft or "intruders" are identified on display 100 by icons or "tags" 120, 122, 124, 126, 128 and 130. Tags 120, 122, 124, 126, 128 130 are conventionally shaped as circles, diamonds or squares and are color coded (not shown) to provide additional information. Each square 120 and 122 colored red represent an intruder entering warning zone and suggests an immediate threat to the host aircraft with prompt action being required to avoid the intruders. Each circle 124, 126, and diamond 128, 130 colored amber represents an intruder entering caution zone and suggests a moderate threat to the host aircraft recommending preparation for intruder avoidance. Diamonds 128, 130 represent near or "proximate traffic" when colored solid blue or white and represents more remote traffic or "other traffic" when represented as an open blue or white diamond. Air traffic represented by either solid or open diamond 128, 130 is "on file" and being tracked by the TCAS.

Each icon or tag 120, 122, 124, 126, 128 130 is accompanied by a two digit number preceded by a plus or minus sign. In the illustration of FIG. 4 for example, a "+05" is adjacent square tag 120, a "−03" is adjacent square tag 122 and a "−07" is adjacent diamond tag 130. Each tag may also have an vertical arrow pointing either up or down relative to the display. The two digit number represents the relative altitude difference between the host aircraft and the intruder aircraft, the plus and minus signs indicating whether the intruder is above or below the host aircraft. Additionally, the two digit number appears positioned above or below the associated tag to provide a visual cue as to the intruder aircraft's relative position: the number positioned above the tag indicates that the intruder is above the host aircraft and the number positioned below the tag indicates that the intruder is below the host aircraft. The associated vertical arrow indicates the intruder aircraft's altitude is changing at a rate in excess of 500 feet per minute in the direction the arrow is pointing. The absence of an arrow indicates that the intruder is not changing altitude at a rate greater than 500 feet per minute.

Flight Identification

The invention provides means for selecting or designating an aircraft for determining flight identification, or FLT ID. The invention provides various methods for toggling through each of the aircraft on the screen of display 100 and identifying the flight.

Figure 5A:
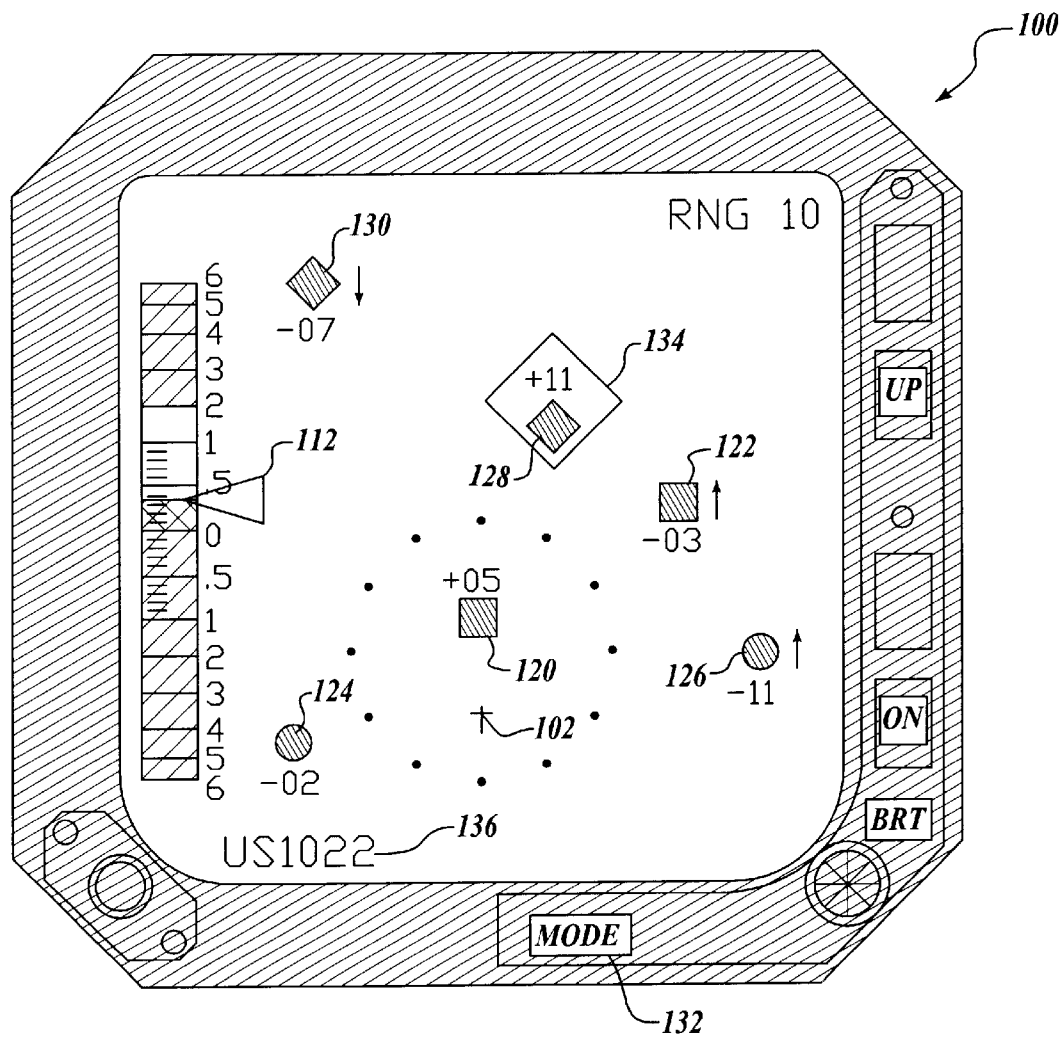
FIG. 5A illustrates a first method of the present invention for selecting an aircraft to determine flight identification in which the operator toggles through the various aircraft appearing on the display of the invention by repeatedly activating a switch, and further illustrates a first method of the present invention for unambiguously delineating a selected aircraft on the display by placing a box around an icon representing the selected aircraft.

FIG. 5A illustrates a first method for selecting an aircraft for determining flight identification in which the operator or pilot toggles through the various aircraft on the screen by repeatedly activating a switch, such as mode control 132, which preferably also provides the same functions as mode control 36 of prior art display 10. Thus, the pilot is able to "tour" the local aircraft before selecting one. When selected, the aircraft icon on the screen is clearly delineated. According to one embodiment of the invention, a stick or line drawing type delineator is placed around the icon representing the selected aircraft. For example, in FIG. 5A the currently selected aircraft icon 128 appears within a diamond shaped delineator 134 formed as a type of line drawing. Alternative embodiments include delineating the selected aircraft by placing another shape, such as a circle, or square or another suitably shaped polygon around the selected aircraft. Preferably, the delineator surrounding the selected aircraft icon is colored to stand out on the screen. For example, delineator 134 is colored using cyan to designate the selected aircraft. According to one embodiment of the invention, the delineator is a change in the color of the icon representing the selected aircraft. Accordingly, the invention changes the icon color from one of the usual colors designating hazard level, as described above, to a different and clearly delineating color. Preferably the delineating color is a new color, such as cyan, rather than one of the colors commonly used to provide other information, such red, blue, white, or amber commonly used as hazard level indicators. According to another embodiment of the invention, the delineator highlighting the selected aircraft is a "blinking" icon, whereby the icon is made alternately visible and not visible, for example, by flashing the icon alternately on and off for short periods. Preferably the delineating blinking or flashing is at a rate whereby the icon is easily discerned but clearly delineated. According to the invention, the flight identification of the thusly selected aircraft is determined from the Mode-S identifier and displayed on the screen as a text message 136. Positioning of text message 136 is optional. According to one embodiment of the invention, text message 136 appears in the lower portion of the screen, for example, in one corner of the screen, as shown.

Figure 5B:
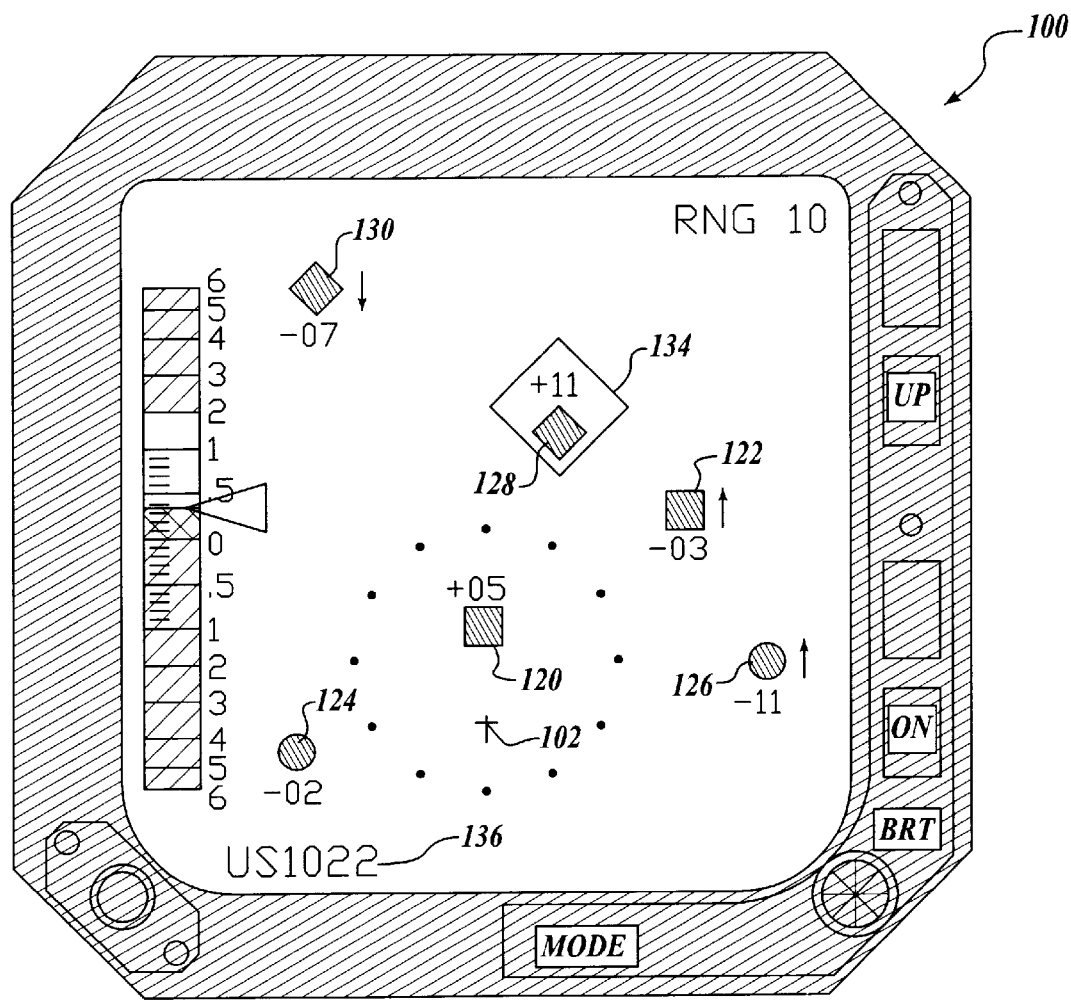
FIG. 5B illustrates another method of the present invention for selecting an aircraft to determine flight identification in which the operator uses a conventional keyboard to type in the desired Mode-S identifier.

FIG. 5B illustrates another method of selecting or designating an aircraft for determining flight identification in which the operator or pilot uses a data entry device to enter the desired Mode-S identifier. For example, in FIG. 5B, a conventional keyboard 138 is used to type in the desired Mode-S identifier. The screen icon representing the selected aircraft is delineated by one or more of the above described delineators. Furthermore, the flight identification is displayed on the screen as text message 136.

FIG. 5C illustrates another method of selecting or designating an aircraft for determining flight identification in which the operator or pilot selects the desired aircraft by means of a datalink 140 whereby the Mode-S identifier is uploaded or the identification is made by direct controller designation. The operator or pilot accepts or rejects the delineated icon to select the desired aircraft by operating accept/reject controls 142, 144. The screen icon representing the selected aircraft is again delineated by one or more of the above described delineators. Furthermore, the flight identification is displayed on the screen as text message 136.

Relative Velocity Vector

According to one embodiment of the invention, a visual simulation of the velocity vectors of nearby aircraft relative to the host aircraft is provided. Preferably, the visual simulation includes relative velocity and trend vector symbols that are quickly and easily interpreted, such that the pilot is able to assess the surrounding air traffic situation essentially at a glance. Accordingly, the invention displays distinct relative velocity and trend vector symbols. For example, an arrow symbol is displayed to simulate a relative velocity in excess of a predetermined threshold or minimum, and a cross symbol is used to simulate a relative velocity below the predetermined threshold. Alternatively, other symbols are used to represent relative velocity vectors, using distinction from the 500 feet per minute climb/descent symbols as a determining criterion. Preferably, the relative velocity and trend vector symbols are rotated relative to the host aircraft heading to symbolize drift of each of the surrounding aircraft relative to the host aircraft and placed approximately along the relative velocity and trend vector. Also, relative velocity and trend vector symbols are oriented toward the host aircraft to represent closure and away from the host aircraft to represent separation. Because typical approach speeds for air transport traffic is in the range of 100 to 250 knots, a predetermined relative velocity threshold of 0.5% results in a predetermined minimum closure or separation rate threshold in the approximate range of 0.5 to 1.25 knots. While using a relative velocity threshold based on percentage of approach speed provides notice at different closure and separation rates as a function of approach speed, one alternative embodiment uses a predetermined fixed minimum relative velocity threshold. Optionally, the velocity vector symbols are varied in length as a function of relative velocity, increasing and decreasing respectively with increasing and decreasing relative velocity.

Figure 6A:
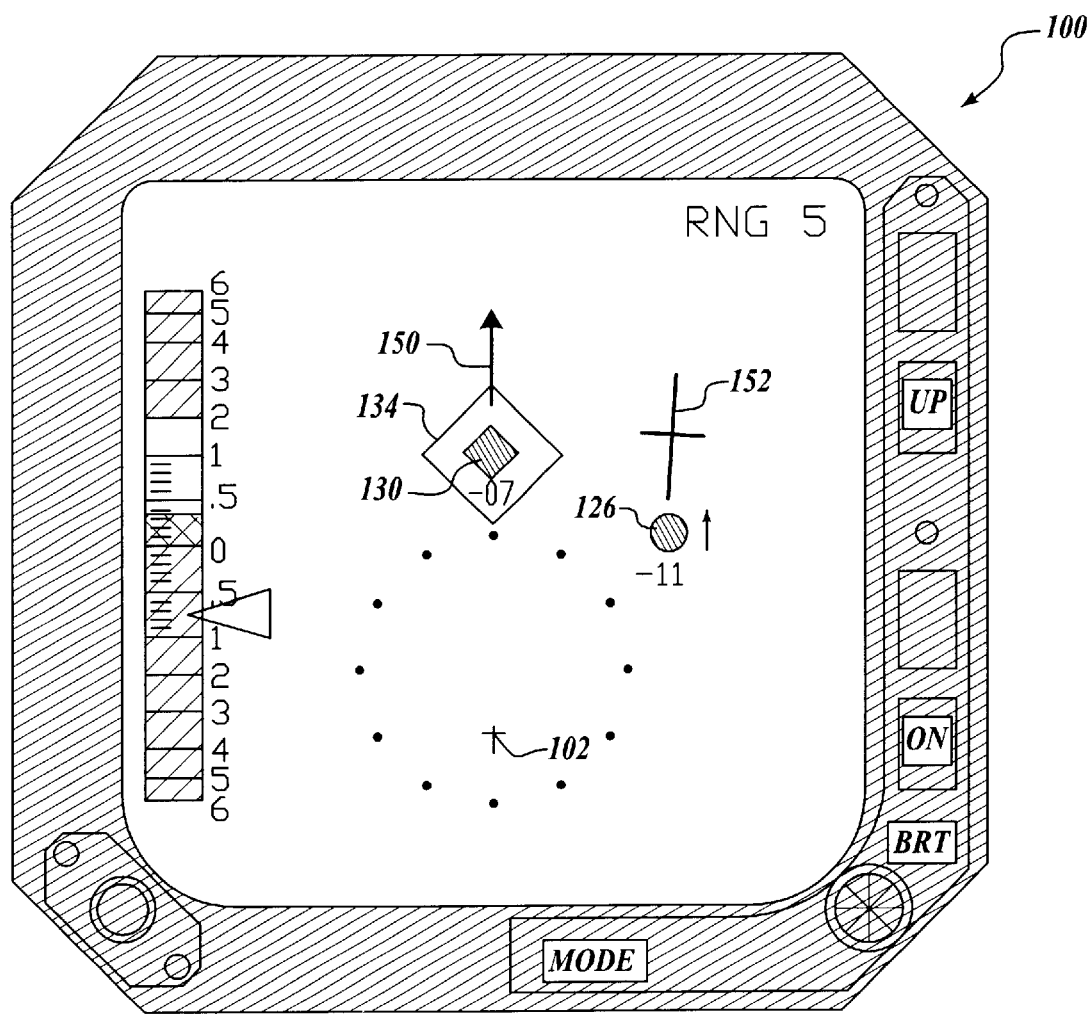
FIGS. 6A, 6B and 6C each illustrates the visual symbolism of the invention in which a first relative velocity relative velocity and trend vector symbol represents the relative motion of the selected aircraft when the selected aircraft is moving at or above a predetermined threshold rate relative to the host aircraft and a second relative velocity and trend vector symbol represents the relative motion of the selected aircraft when the selected aircraft is moving at less than a predetermined threshold rate relative to the host aircraft, and further illustrates the visual symbolism of the invention in which the orientation of the first and second relative velocity and trend vector symbols indicate the flight path of the selected aircraft relative to the host aircraft.
Figure 6B:
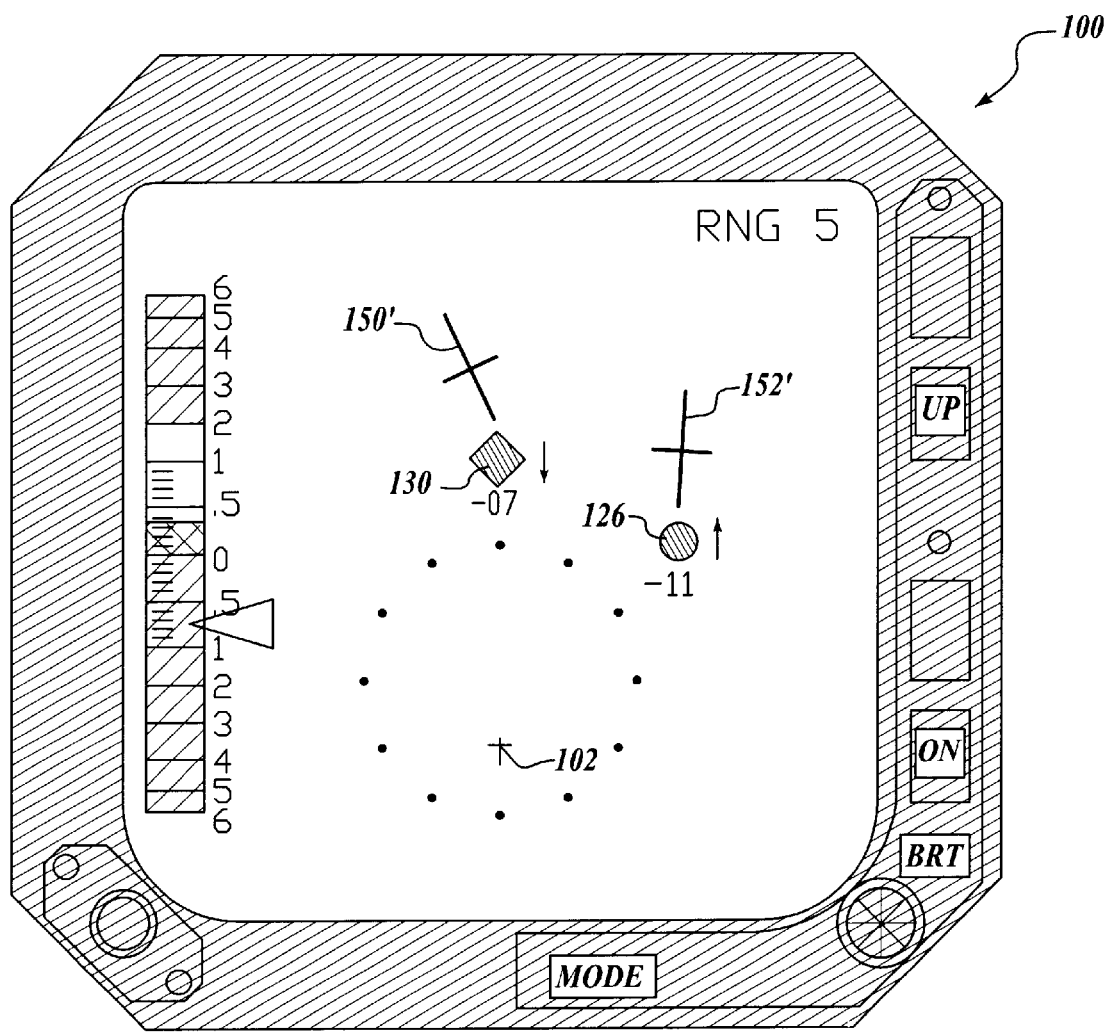
Figure 6C:
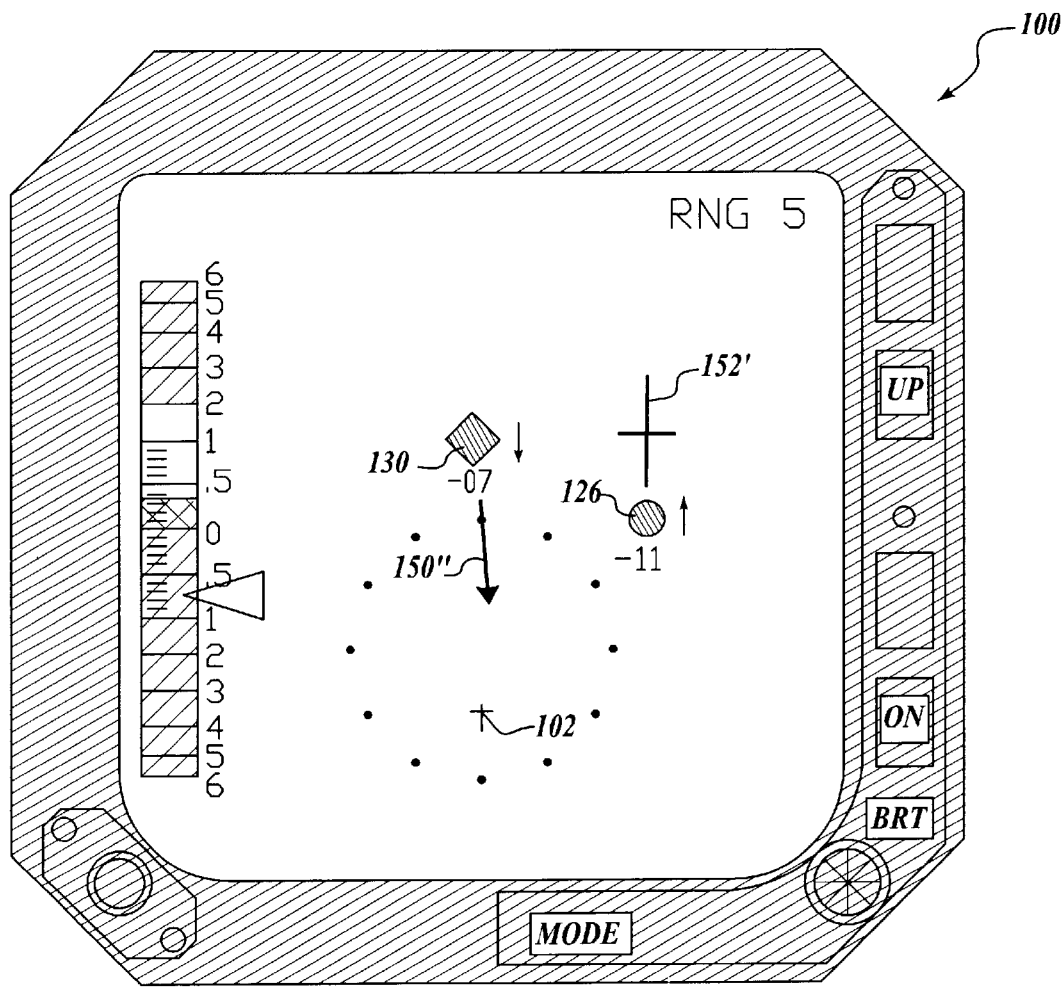

FIGS. 6A, 6B and 6C illustrate sequential changes in the relative velocity and trend of two target aircraft within the range displayed on the screen. Color (not shown) is optionally used to differentiate the relative velocity and trend vectors of the invention. For example, the relative velocity and trend vector symbols are colored to stand out on the screen without interfering with other presented information. According to one embodiment of the invention, the relative velocity and trend vector symbols are colored a new color, such as cyan, different from the colors commonly used to provide other information, such red, blue, white, or amber commonly used as hazard level indicators. Optionally, the color of relative velocity and trend vector symbols are changed to a new color, such as red, if the relative motion of the designated aircraft results in a heightened hazard warning, such as a Resolution Advisory. According to one alternative embodiment of the invention, the relative velocity and trend vector symbols are colored similarly to the square-, round-, and diamond-shaped aircraft symbols, i.e., red, blue, white, or amber.

FIG. 6A illustrates the relative velocity and trend vectors of the invention. In FIG. 6A, arrow symbol 150 represents the velocity vector of the aircraft represented by icon 130. Arrow symbol 150 indicates that the icon 130 aircraft is moving relative to the host aircraft at or above the predetermined threshold rate. The orientation of arrow symbol 150 indicates that the flight path of the icon 130 aircraft is approximately the same as that of the host aircraft, and that the velocity of the icon 130 aircraft relative to the host aircraft is separating the two aircraft or increasing the range of the icon 130 aircraft relative to the host aircraft. Diamond 134 surrounds icon 130 to indicate that the aircraft represented by icon 130 is the currently selected target aircraft.

Cross symbol 152 in FIG. 6A represents the velocity vector of the aircraft represented by icon 126. Cross symbol 152 indicates that the icon 126 aircraft is moving relative to the host aircraft at less than the predetermined threshold rate. The orientation of the icon 126 aircraft indicates that the flight path of the icon 126 aircraft is tending away or diverging from that of the host aircraft. The invention determines that the course of the target aircraft is either converging or diverging relative to the host aircraft's course when the delta between the two courses is greater than a predetermined threshold. The threshold is, for example, a percentage, such as 0.1%, or a fixed angular difference between courses, such as 0.5 degrees. Accordingly, the course of the target aircraft is either converging or diverging with that of the host aircraft when the delta between the two courses is greater than the predetermined threshold, while the two aircraft are flying parallel courses when the delta between the two courses is less than the predetermined threshold. The orientation of the icon 126 aircraft also indicates that the velocity of the icon 126 aircraft relative to the host aircraft is separating the two aircraft.

FIG. 6B illustrates the situation wherein the lead aircraft, represented by icon 130, has slowed relative to the host aircraft such that the relative motion between the two aircraft is less than the predetermined minimum threshold, as indicated by the change of relative velocity and trend arrow symbol 150 shown in FIG. 6A to cross symbol 150'. Furthermore, the heading of the icon 130 aircraft has rotated relative to the host aircraft such that the course of the icon 130 aircraft is now diverging from that of the host aircraft, as indicated by the relative orientation of relative velocity and trend 150'. The heading of the icon 126 aircraft has also rotated relative to the host aircraft such that the course of the icon 126 aircraft is now approximately parallel to that of the host aircraft, as indicated by the relative orientation of relative velocity and trend 152'.

FIG. 6C illustrates the situation wherein the lead aircraft, represented by icon 130, has slowed relative to the host aircraft such that significant closure, greater than the predetermined minimum threshold, now exists between the two aircraft, as indicated by the change of relative velocity and trend cross symbol 150' shown in FIG. 6B to arrow symbol 150" oriented generally toward host aircraft symbol 102.

Wake Vortex

Detailed wake vortex information pertaining to aircraft nearby the host aircraft may be available using either radar or LIDAR, or another suitable information source. For example, current predictive windshear radar implementations successfully measure the location, i.e., angle and distance, of turbulence or other disturbances in the atmosphere relative to the host aircraft. Accordingly, location and/or intensity of wake vortices of nearby aircraft are measured directly and, based on the measurement information, visual simulations of the measured wake vortices are provided. According to another embodiment of the invention, the TCAS provides information regarding the flight paths, speed, and relative positions of nearby aircraft for use in predicting the location and intensity of wake vortices of nearby aircraft and visual simulations of the wake vortices are displayed. According to one embodiment, predictive algorithms are based on many studies of wake vortices caused by different aircraft under different environmental conditions used to establish the changing intensities and locations of resulting wake vortices. The resulting predictive algorithms also include, for example, the aircraft speed, type and weight and the local wind conditions as factors in predicting the location and intensity of resulting wake vortices.

The present invention provides a method and system for predicting and indicating to the aircraft operator and operator maintenance organization the presence of a wake vortex encounter. The system uses data provided by The TCAS about intruders in or near the flight path of the host aircraft, as well as information on the host aircraft. This data is provided to a wake vortex prediction algorithm. The algorithm predicts the extent, severity, and direction of the wake vortex flow. This wake vortex information is recorded in nonvolatile memory and provided to aircraft systems for display to the aircraft, for example, using the TCAS display.

The system collects the following information: 1) intruder position relative to host aircraft position as provided by TCAS; 2) intruder weight class and other aircraft type information provided by TCAS surveillance or another passive surveillance source, such as a look-up Table having stored aircraft type information, for example, by flight identification, or a look-up Table code is included with or in the Mode-S code sent by the intruder aircraft in order to allow the host aircraft to determine aircraft-type; 3) intruder barometric elevation above mean sea level (MSL) as provided by TCAS surveillance or another passive surveillance source; 4) intruder elevation from intruder position information provided by TCAS, terrain elevation provided by the Enhanced Ground Proximity Warning System (EGPWS) from the terrain database; 5) local runway information provided by the EGPWS based on an airport database; 6) intruder configuration, i.e., landing gearing and flap position, as predicted based on aircraft relative position and attitude with respect to the runway as by TCAS surveillance or another passive surveillance source; 7) local wind strength and direction as provided by on-board navigational sensors such as Inertial Reference System (IRS ), Inertial Navigation System (INS) or Global Positioning System (GPS), or navigation system such as Flight Management System (FMS); and 8) local temperature. Additional optional information may include intruder ground speed, altitude and airspeed and ground speed information in the Made S code from the aircraft traffic. The intruder configuration and attitude is alternatively received via transponder. This collected information is processed by the algorithm of the invention which estimates the severity, extent, and drift of the wake vortex.

The information is graphically displayed using visual symbology as described herein for situational awareness. The invention alerts the aircraft operator if the host aircraft is predicted to pass through the wake vortex as predicted in the algorithm mentioned above. The invention also preferably records the data along with relevant parameters for post flight evaluation. The TCAS or Airborne Collision Avoidance System (ACAS) are preferably the primary systems used to collect the above mentioned parameters. The TCAS or ACAS may contain the prediction algorithm and provide the display and alert information to appropriate aircraft systems. In all cases, the wake vortex algorithms and processing are preferably partitioned from the collision avoidance function in such a manner as to not interfere with the collision avoidance function.

Figure 7:
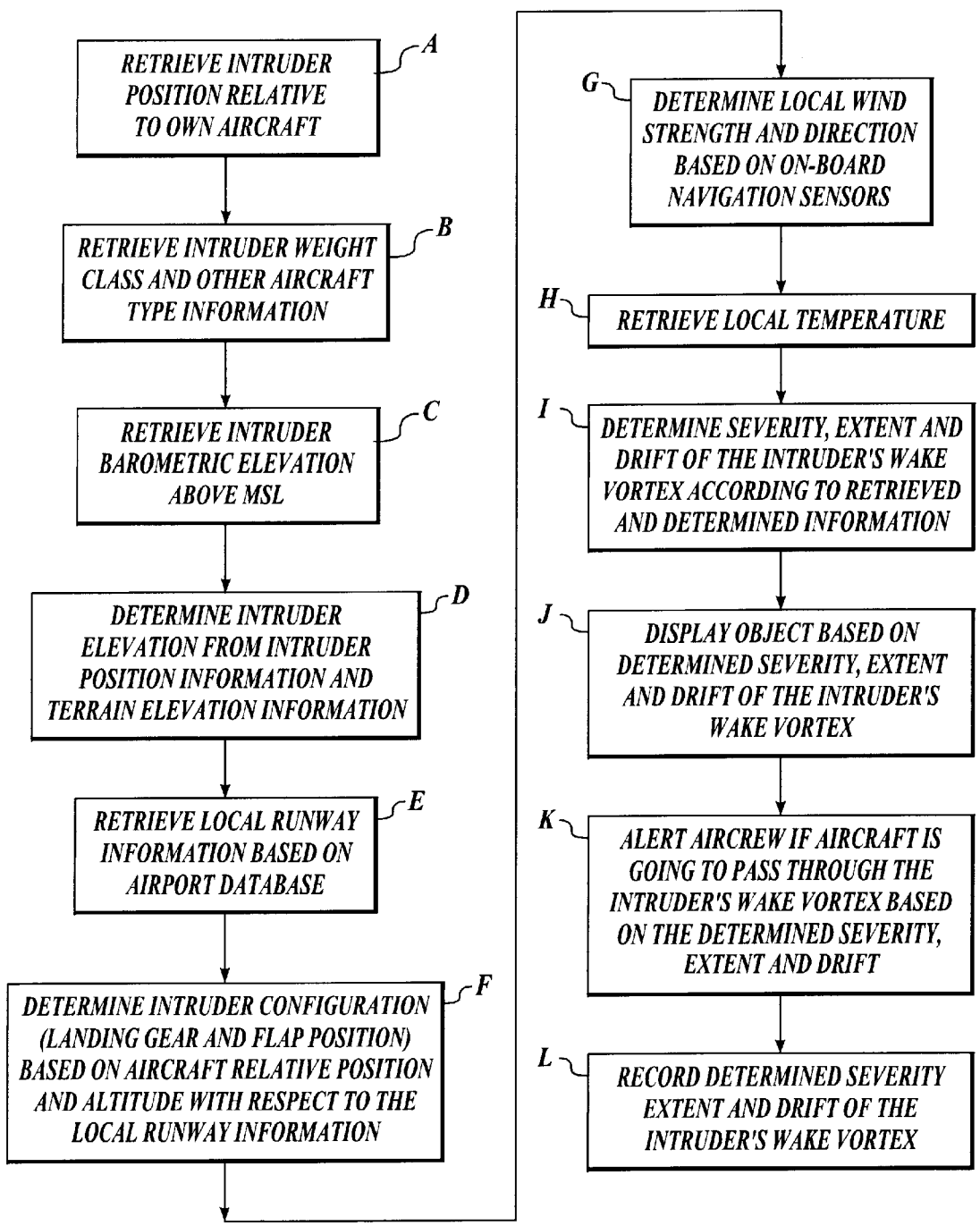
FIG. 7 illustrates exemplary steps of the wake vortex predictive algorithm performed by the present invention.

FIG. 7 illustrates exemplary steps of the wake vortex predictive algorithm 155 performed by the present invention. In Block A of wake vortex predictive algorithm 155, TCAS 1 interrogates the intruder aircraft, for example, lead aircraft 130 shown in other FIGURES, and using standard functions of TCAS 1 determines intruder position and motion relative to host aircraft. TCAS 1 information includes: range, relative bearing, relative heading, relative air speed, and relative vertical speed. Furthermore, in Block B the intruder aircraft weight class and other aircraft type information are determined using TCAS surveillance information or information from another passive surveillance source. According to preferred embodiments of the invention, the host aircraft determines the intruder's weight class, rather than its actual weight. The intruder's Mode-S transponder reply signal and its Automatic Dependent Surveillance—Broadcast (ADS-B) each include the intruder's weight class information within its standard format. Accordingly, either the host aircraft's TCAS interrogates the intruder's Mode-S transponder and decodes its reply signal, or decodes its Automatic Dependent Surveillance-Broadcast (ADS-B) to determine the intruder's weight class information. The information is used in wake vortex predictive algorithm 155.

According to one alternative embodiment of the invention, the intruder's weight class information is determined from a look-up table of aircraft weight class information. Accordingly, the intruder is identified using its unique 24-bit Mode-S address code, or identity tag. This identification information is used in Block B to access a look-up table having stored aircraft type information which is searched, for example, by flight identification. Alternatively, the Mode-S identity code includes either a look-up table code for accessing stored aircraft type information in a look-up table or the aircraft information itself, whereby the intruder aircraft weight class and other aircraft type information are identified for use in wake vortex predictive algorithm 155.

The intruder's Mode-C reply includes altitude information from the intruder's onboard altimeter. Preferably, the altitude information is barometric altitude, i.e., altitude above mean sea level. This altitude information is retrieved in Block C for use by wake vortex predictive algorithm 155. In Block D the intruder's absolute position is determined. For example, the intruder's absolute position is calculated based on its position relative to the host aircraft's known position, or the intruder's absolute position is provided directly by interrogation of one or more of the intruder's on-board navigational sensors, such as GPS, INS or IRS. The intruder's barometric altitude and absolute position information are combined with a stored terrain database, such as the terrain elevation database contained in an EGPWS, to determine the intruder's elevation above terrain. Local runway information is retrieved in Block E from a stored airport database, such as the airport database contained in an EGPWS. In Block F the intruder's elevation above terrain and position relative to the local runway information are used to determine the intruder's probable aircraft configuration. In other words, the intruder's elevation and proximity to a local runway, optionally in combination with the previously determined intruder weight class and other aircraft type information, are used to determine the intruder's phase of flight and to predict its landing gear and flap positions. Normally, an aircraft below 500 feet elevation from a runway has landing gear lowered. At 200 feet elevation, the aircraft has its landing flaps positioned. Alternatively, the information is included in the look-up table of stored aircraft type information as a function of, for example, flight identification. Another criterion used in determining or predicting the intruder aircraft's configuration includes the intruder's ground speed calculated, for example, as a function of changing position. According to various alternative embodiments of the invention, different combinations of the different criterion are used to determine or predict the intruder's configuration. For example, according to one alternative embodiment, the intruder's ground speed is combined with its position relative to a local runway to predict phase of flight, which indicates probable aircraft configuration. According to another alternative embodiment, the intruder aircraft configuration is predicted as a function of ground speed, elevation above terrain, and proximity to a local runway. Optionally, the intruder's weight class and other aircraft information are accessed and factored into predicting its configuration.

In Block G conventional onboard navigational sensors provide data on local wind strength and direction, while another onboard sensor provides local temperature data in Block H.

In Block I the intruder's aircraft type information, configuration, speed, position, and elevation data are combined with local wind and temperature data and processed by predictive algorithm 155 to produce an estimate of the position and the length and/or strength of the individual wake vortex associated with each of one or more intruder aircraft.

The intruder's wake vortex has two components of interest: location and dissipation rate. The wake vortex position also has two components: horizontal and vertical. Studies show that the horizontal position component is essentially a direct function of the wind. Known wind speed and direction are combined with the known position of the intruder aircraft, and known physical laws are applied to calculate the horizontal drift of the wake vortex.

The vertical component is assumed to have downward drift, and a nominal value is determined from the empirical study data. For example, a nominal value of 500 feet per minute down drift is applied to the wake vortex vertical position component. The nominal value is modified as a function of any additional relevant information that is or becomes available. For example, the such as closeness of the wake vortex to the ground and vertical temperature profiles both improve the estimate of downward drift. Those of skill in the art will appreciate that increased amount and quality of information improve the algorithm's ability to estimate the vertical position of the vortex.

The dissipation rate or length and strength of the vortex depends heavily on the type of aircraft generating the vortex. The invention provides a look-up table of probable qualitative values of wake vortex length or distance behind the intruder aircraft as a function of weight class. The look-up table includes nominal values for the distance that a wake vortex extends behind the generating aircraft. The nominal distance values are preferably determined as a function of weight class from the available study data. For example, the wake vortex generated by a light to medium aircraft is determined to extend about 3 nautical miles behind the aircraft; a medium to large aircraft is determined to have a wake vortex extending for about 4 nautical miles; and the wake vortex generated by a heavy aircraft is determined to extend about 5 nautical miles. Predictive algorithm 155 accesses the look-up table as function of weight class and retrieves an estimated nominal length of the vortex.

The dissipation rate or length and strength of the vortex also depends on turbulence in the area of the wake vortex. The wind velocity, and terrain obstructions, i.e., closeness to the ground and/or ground interference, affect local turbulence. Therefore, predictive algorithm 155 uses additional relevant information, such as aircraft configuration, wind velocity, turbulence factors, aircraft altitude from the ground, to modify the nominal values as functions of known physical laws, thereby improving the estimated length of a particular intruder aircraft's wake vortex. Such modifications to the nominal length and strength values are preferably accounted for in predictive algorithm 155. Alternatively, multiple modified values are stored in the look-up table. The stored values represent the nominal values based on weight class as modified by other data, such as elevation, terrain obstructions, wind speed, and turbulence factor. According to this alternative embodiment, predictive algorithm 155 accesses the look-up table of modified values using additional data in combination with the intruder's weight class data. For example, predictive algorithm 155 additionally queries the look-up table as a function of the intruder's altitude data, terrain data from an EGPWS database of terrain data, local wind speed and direction data, air temperature data, and/or local turbulence data. The look-up table produces a more accurate estimate of the wake vortex length and strength values based on the additional data.

Preferably, the invention utilizes predictive algorithm 155 dynamically to provide a series of regularly updated estimates of the location and intensity of the intruder's wake vortex. Preferably, predictive algorithm 155 dynamically updates the estimates regarding the intruder's wake vortex using updated atmospheric data and intruder aircraft speed, elevation, configuration and other data to repeatedly access the look-up tables.

Predictive algorithm 155 is operated by a processor onboard the host aircraft. For example, if the TCAS processor includes sufficient excess processing capacity and is coupled to a memory having sufficient space to hold the above mentioned one or more look-up tables, depending upon the specific embodiment of the invention, predictive algorithm 155 is optionally operated by the TCAS processor. Alternatively, additional processing and/or memory capacity is coupled to the TCAS processor for operating predictive algorithm 155. According to another alternative embodiment of the invention, predictive algorithm 155 is operated by the processor contained in another application and having sufficient excess processing and memory capacity, such as the FMS, which is coupled to the TCAS processor via the common avionics bus.

Figure 1:
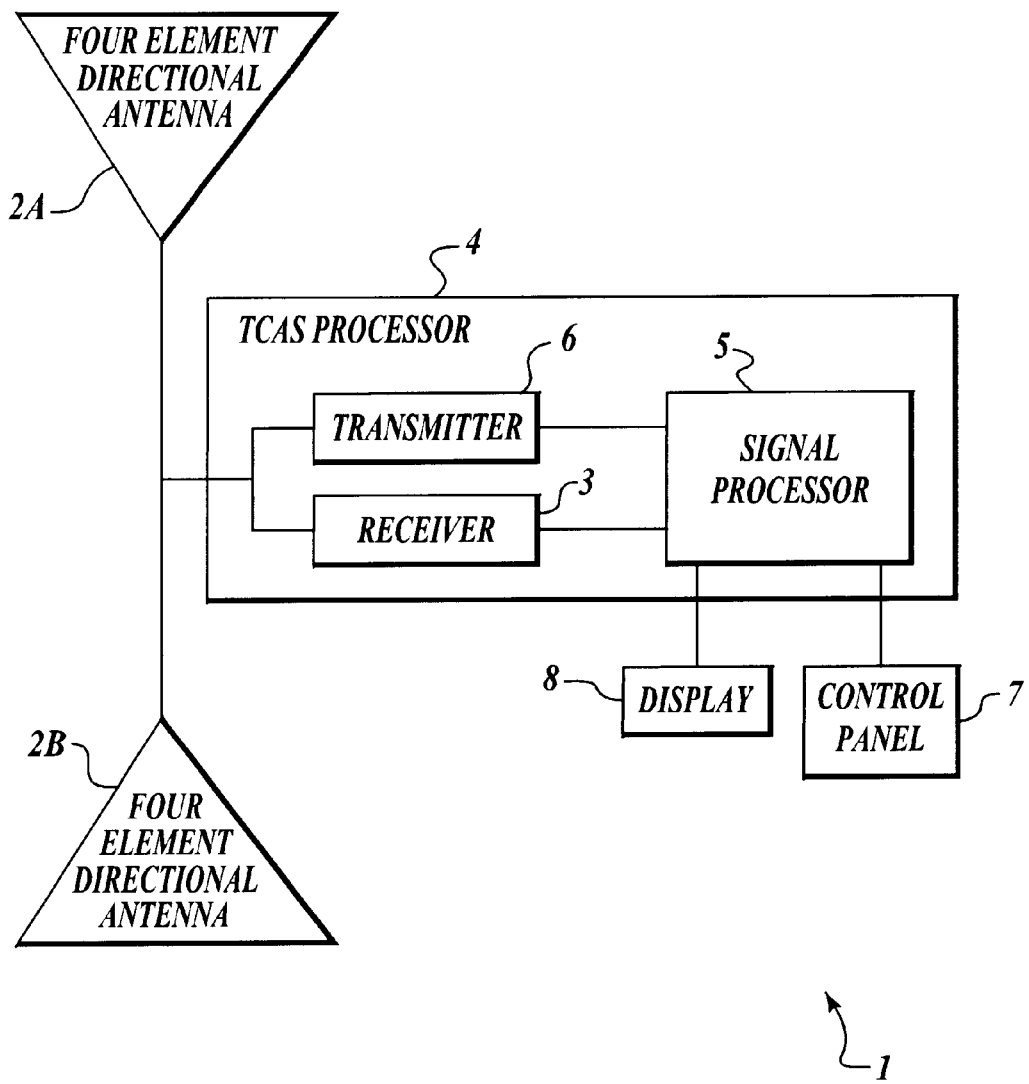
FIG. 1 illustrates one prior art embodiment of the TCAS.
Figure 2:
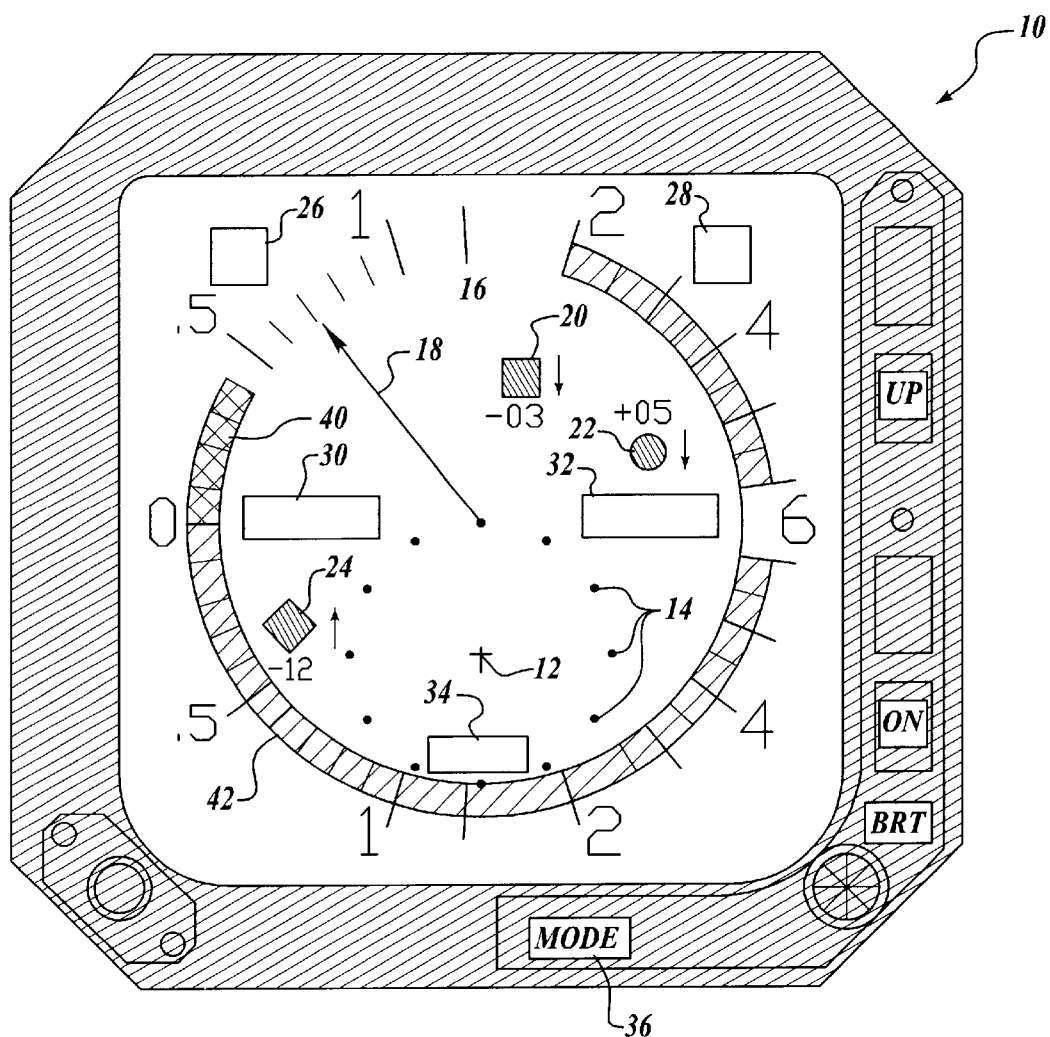
FIG. 2 shows one configuration of a prior art display used with the Traffic Alert and Collision Avoidance (TCAS) system.
Figure 3:
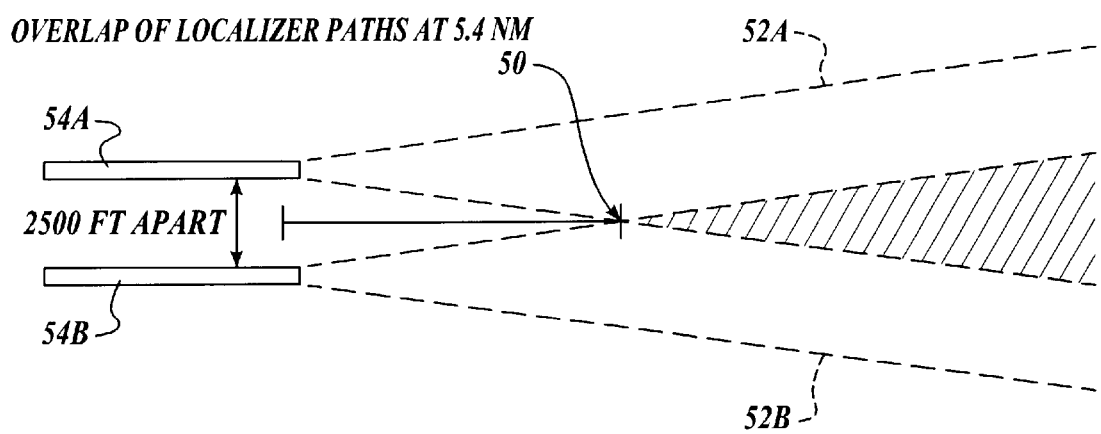
FIG. 3 illustrates the intersecting flight paths between Instrument Landing System (ILS) localizer paths on parallel runways.

In Block J the intensity and location, elevation and/or drift of the one or more intruder's wake vortex are displayed on one of the host aircraft onboard displays. The wake vortex information is established using either predictive algorithm 155 of the invention or another algorithm suitable for predicting wake vortices of aircraft near the host aircraft. Preferably, wake vortex intensity and location information are displayed relative to the respective intruder aircraft on display 8 of TCAS 1, shown in FIG. 1. Preferably, dynamic visualizations of the wake vortex intensity and location information are displayed using suitable visual symbology to describe the intensity, location, and/or elevation of the intruder's wake vortex. Preferably, the visual symbology used is one or more of the visual symbologies disclosed herein.

Optionally, in Block K, using known algorithms, the trajectories of the host aircraft and the intruder's wake vortex are computed and compared to predict whether the host aircraft's trajectory will intersect the wake vortex of one or more intruder aircraft. The trajectory intersection algorithm is preferably operated dynamically using one or more of the changing intensity and location, elevation and/or drift of the wake vortices in combination with the changing position and altitude of the host aircraft relative to the respective wake vortices of various intruder aircraft. Using the dynamic three-dimensional description of the host aircraft's trajectory relative to the wake vortices of intruder aircraft, predictive algorithm 155 preferably generates an alert whenever the trajectory intersection algorithm predicts that the current trajectory of the host aircraft will intersect an intruder's wake vortex. Preferably, if an intersection with the wake vortex of an intruder aircraft is predicted, the invention generates an alert. The alert is optionally either or both of a visual warning displayed on TCAS display 8 and a meaningful and unambiguous audible warning. For example, the display draws an appropriately colored line or arrow 156 (shown without distinctive coloration in FIG. 8A) along the host aircraft flight path from visual icon 102, representing the host aircraft, to the visual representation 160 of the wake vortex following the intruder. The aural warning generated by predictive algorithm 155 is, for example, "VORTEX" or "WAKE VORTEX," or another suitably meaningful and unambiguous word or phrase.

Preferably, predictive algorithm 155 also records the severity or strength, the extent or length, and the drift of the intruder's wake vortex, as shown in Block L. Such wake vortex encounter information is preferably recorded or stored in nonvolatile memory coupled to TCAS 1 and is available to extend the available empirical study data and to improve the predictive model used in predictive algorithm 155. The information is also useful for pilot training and simulations.

The development of other algorithms based on commonly known principals of physical science and having equal effectiveness in predicting the location and intensity of wake vortices is within the skill those of ordinary skill in the art without undue experimentation. For example, above incorporated U.S. Pat. No. 5,325,302 describes a method for predicting collision between two or more relatively moving objects, including determining a respective position in space for each one of the objects relative to a fixed frame of reference at a predetermined frequency to produce successive frames of positional data for each object with a coupled memory for storing the successive positional data frames, computing a trajectory for each object relative to the fixed frame of reference, and predicting whether two or more trajectories will intersect. Such wake vortex location and intensity information produced using such other algorithms is similarly useful in developing the visual simulations of the invention and are therefore contemplated by the invention. For example, according to one known method, the wake vortex length, intensity and drift are derived by using the intruder's unique Mode-S code to access a stored look up Table to determine the type of aircraft. The host aircraft ground speed, altitude and airspeed, and the intruder's aircraft's ground speed, can be used to infer the intruder's configuration and angle of attack. Having determined the intruder's configuration and received the intruder's transmitted altitude, a predicted 3-dimensional track can be determined and "dissipated" depending on local turbulence based on local wind conditions. Thus, for example, if the intruder is a wide body aircraft positioned above the host aircraft and descending, a possible encounter with a powerful wake vortex is likely. Thus, while the preferred embodiment of the invention has been illustrated and described, it will be appreciated that various changes can be made thereto without departing from the spirit and scope of the invention.

Preferably, the visual simulation of the invention includes wake vortex symbols that are quickly and easily interpreted, such that the pilot is able to assess the wake vortices of surrounding air traffic essentially at a glance. Preferably, the predicted wake vortex information is updated regularly and the wake vortex symbols are modified as necessary to display the updated information. According to one embodiment of the invention, the symbology simply extends along the target aircraft velocity vector. Alternatively, the symbology describes the calculated average wake vortex position to show where the target aircraft created the wake vortex. According to another alternative embodiment, the symbology describes the actual flight path of the target aircraft whereby the symbology transcribes the path where the wake vortex is calculated to lie. Any embodiment of the invention alternatively includes a calculated length and/or strength of the individual wake vortices. Optionally, the displayed wake vortex information includes a calculated drift relative to the flight path of the target aircraft.

The symbology used to display wake vortex information is, for example, any of a simple line, a conical representation, a warning box, or other suitable visual symbology sufficiently different from the symbology representing other displayed information as to promote quick and easy identification and avoid confusion. According to one embodiment of the invention, the wake vortex information is displayed at all times during flight. However, according to various alternative embodiments, the wake vortex information is displayed only when the host aircraft is below a predetermined altitude, such as 18,000 feet or 10,000 feet. Altitude is measured either as above ground level (AGL) or above mean sea level (MSL). According to another alternative embodiment, wake vortex information is displayed only during approach or the terminal phase of flight.

Figure 8A:
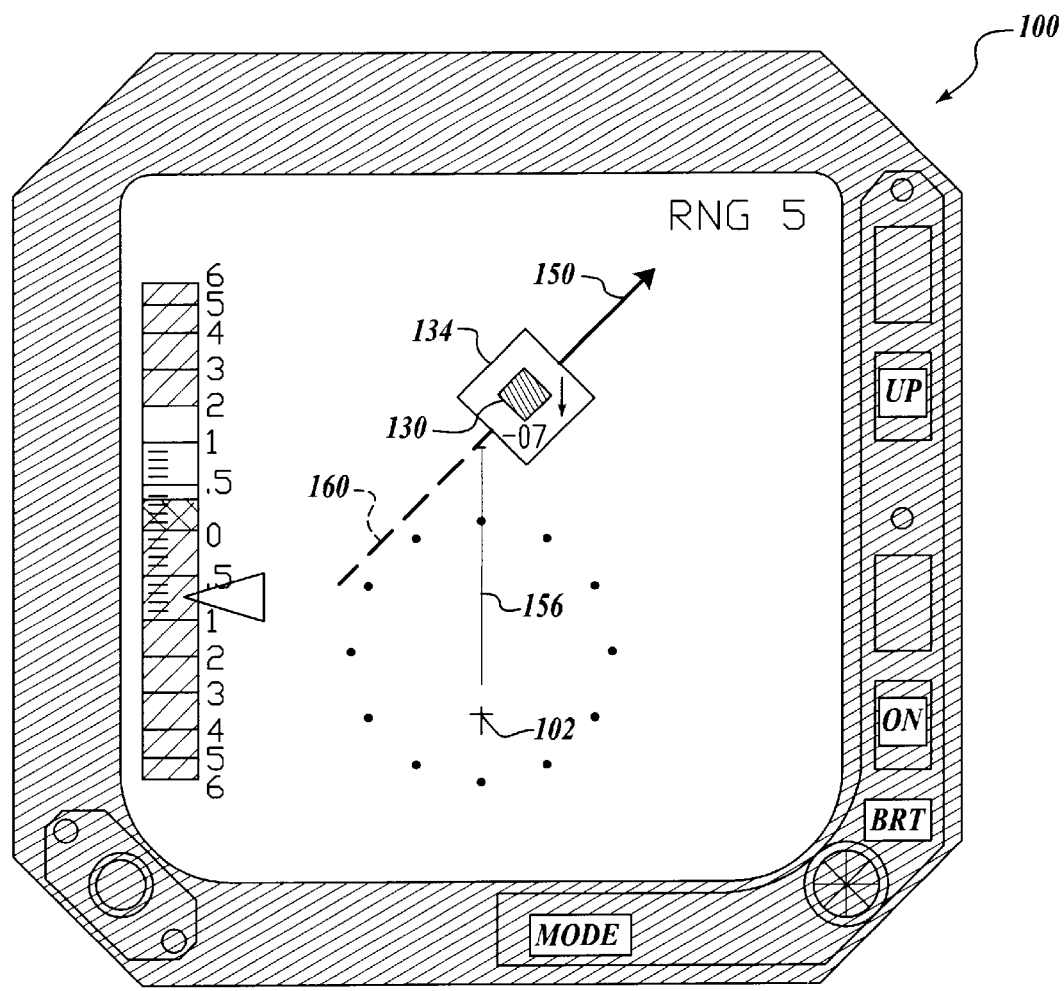
FIG. 8A illustrates one embodiment of the visual symbolism of the present invention describing wake vortex information, the visual symbolism formed as a line aligned with and extended along the relative velocity vector associated with the selected aircraft.

FIG. 8A illustrates one embodiment of the invention in which the visual symbolism describing wake vortex information is a dashed line 160 aligned with and extended along relative velocity vector 150 associated with the icon 130 target aircraft. In other words, the visual symbolism describing wake vortex information, dashed line 160, is aligned with a relative heading of the icon 130 target aircraft. In FIG. 8A, wake vortex symbol 160 is easily distinguishable from other displayed information due to the location along the relative flight path of the icon 130 target aircraft and the difference in symbology from other displayed information. The limited information provided by wake vortex symbol 160 is quickly and easily interpreted, such that the pilot is able to assess the wake vortices of surrounding air traffic essentially at a glance. FIG. 8A additionally illustrates arrow 156 visually illustrating the predicted intersection described above of the host aircraft, represented by icon 102, with an intruder aircraft wake vortex, represented by wake vortex symbol 160.

Figure 8B:
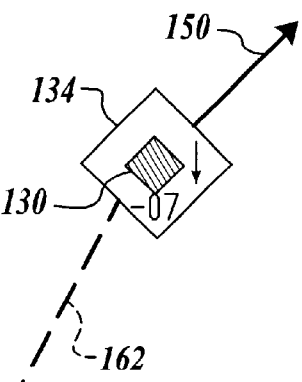
FIG. 8B illustrates an alternative embodiment of the visual symbolism of the present invention describing a predicted average position of the wake vortices of surrounding aircraft relative to the host aircraft.
Figure 8C:
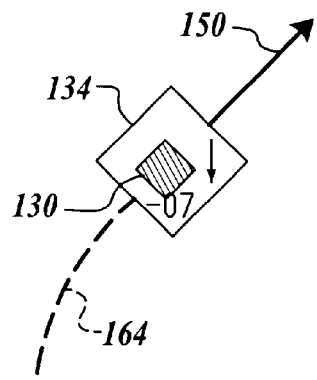
FIG. 8C illustrates an alternative embodiment of the visual symbolism of the present invention describing the wake vortices of surrounding aircraft by describing the actual flight path of the surrounding aircraft relative to the host aircraft.

FIG. 8B illustrates a first alternative embodiment of the present invention, wherein a wake vortex symbol 162 describes an average wake vortex position relative to the host aircraft calculated using the sensed wake vortex information and the above mentioned predictive algorithms to show where the icon 130 target aircraft created its associated wake vortex. The predicted wake vortex is updated regularly and wake vortex symbol 162 is modified as necessary to display the updated information. FIG. 8C illustrates another alternative embodiment of the invention, wherein a wake vortex symbol 164 describes the arc of the actual flight path of the icon 130 target aircraft. Thus, wake vortex symbol 164 transcribes the path where the wake vortex actually lies, as calculated using the sensed wake vortex information and the above mentioned predictive algorithms. The various embodiments illustrated in FIGS. 8B and 8C optionally include a calculated drift of the wake vortex relative to the flight path of the icon 130 target aircraft.

Figure 8D:
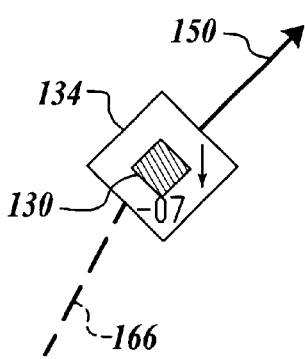
FIGS. 8D and 8E illustrate alternative embodiments of the visual symbolism of the present invention describing the intensity of the wake vortices of surrounding aircraft.
Figure 8E:
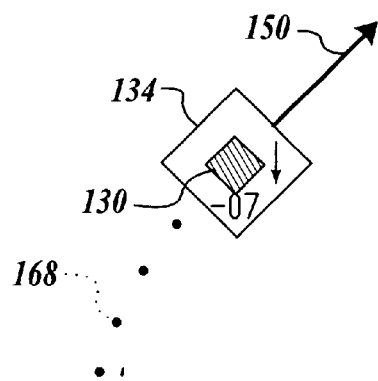

FIGS. 8D and 8E illustrate other additional alternative embodiments of the present invention, wherein the visual symbology representing the wake vortices of surrounding aircraft includes length and/or strength information describing each of the individual wake vortices. The strength and/or length describing the power and extent or "intensity" of individual wake vortices is calculated using the above mentioned predictive algorithms as a function of the speed, size, weight and/or configuration of the target aircraft. Optionally, the speed, size, weight and/or configuration of the host aircraft are also factors in the wake vortex computation. The intensity computation preferably furthermore includes a wind factor that accounts for increased rapidity of dissipation of the wake vortex when higher velocity winds are present. For example, wake vortices are known to dissipate more rapidly when a wind of 15 knots or more is present. The intensity of individual wake vortices is displayed using any of several different symbologies. For example, according to one embodiment of the invention, the length of the wake vortex symbols shown in FIGS. 8A, 8B, or 8C is varied according to the calculated intensity.

Alternatively, a numerical value describing wake vortex intensity is displayed. According to a preferred alternative embodiment, wake vortex intensity is displayed by dividing the speed of the target aircraft into discrete ranges or "buckets," and varying the number of displayed symbols to indicate speed. For example, the speeds of air transport aircraft are assumed to be a minimum of 100 knots during approach, and in the range of 100 to 200 knots. The 100 knot range between 100 and 200 knots is divided into 5 "buckets" of 20 knots, such that each "bucket" represents 20 additional knots over the assumed 100 knot minimum approach speed. Thus, 1 "bucket" represents 120 knots, 2 "buckets" represent 140 knots, and so on. The wake vortices are displayed as a "tail" of "buckets" wherein the number of "tail" members is proportional to the speed of the target aircraft. Preferably, all predicted wake vortices over 200 knots are represented by a maximum of 5 speed "buckets" in the tail. For purposes of computing the speed of each target aircraft, speed is alternatively based on either ground speed or ground speed adjusted for relative windage. A selected aircraft's speed is alternatively computed relative to the host aircraft using, for example, TCAS distance and bearing inputs in combination with the target aircraft's true airspeed (TAS). Alternatively, the target aircraft's speed is determined using the squittered velocity from the aircraft's Automatic Dependent Surveillance-Broadcast (ADS-B).

FIGS. 8D and 8E illustrate the "bucket" method of displaying wake vortices. In FIG. 8D, the speed of the icon 130 target aircraft is displayed as a trail 166 formed of a series of dashes trailing the icon 130 aircraft. Each dash in trail 166 represents a "bucket" of 20 knots of speed. Thus, the three dashes forming trail 166 represent 3 times 20 knots plus the assumed minimum 100 knots of approach speed for an easily and quickly interpreted total of 160 knots. FIG. 8E illustrates the speed of the icon 130 target aircraft using a tail 168 formed of a series of dots, wherein each dot represents a 20 knot "bucket" of speed. Thus, the 5 dots in trail 168 represent 5 times 20 knots plus 100 knots minimum approach speed for a total of 200 knots. The dashes forming trail 166 of FIG. 8D have the advantage of being easily formed in software. On the other hand, the dots forming trail 168 of FIG. 8E have the advantage of being easily distinguished from all of the other lines, arrows, and dashes displaying other information on the screen and easier to resolve when display 100 is an Active Matrix Liquid Crystal Display (AMLCD).

As shown in each of FIGS. 8D and 8E, the useful aspects of the embodiments illustrated in FIGS. 8B and 8C are variously combined in trails 166, 168 such that the location of each individual wake vortex, optionally including a calculated drift, is displayed in a manner that also informs wake vortex intensity.

According to an alternative embodiment of the wake vortex display disclosed immediately above, the wake vortex symbologies each represent actual geographic length of the wake vortex rather than wake vortex intensity. Accordingly, the line representing the length of wake vortex symbol 160 shown in FIG. 8A or each wake vortex symbols 162 and 164 shown in FIGS. 8B and 8C, respectively, is varied according to the calculated geographic extent of the wake vortex. Alternatively, a numerical value describing wake vortex geographic extent is displayed. According to one preferred alternative embodiment, in FIG. 8D the dashes forming trail 166 and the dots forming trail 168 represent actual geographic length of the wake vortex rather than wake vortex intensity. Accordingly, the dashes and dots represent discrete ranges or "buckets" of geographic distances. For example, each dash and dot represents a 1 nautical mile length of wake vortex. Thus, the three dashes forming trail 166 represent 3 times 1 nautical mile length of wake vortex for an easily and quickly interpreted total of 3 nautical miles of wake vortex trailing the icon 130 target aircraft. Similarly, in FIG. 8E, the series of 5 dots forming tail 168 represent 5 nautical miles of wake vortex trailing the icon 130 target aircraft. The geographic length symbolism is optionally computed including drift.

Preferably, the wake vortex symbology in each of the preferred and alternative embodiments is colored to stand out on the screen. For example, dashed line 160, the dashes forming trails 162, 164, 166, and the dots forming trail 168 are colored differently from the other displayed symbology used to provide other information. Preferably the chosen color is a new color, such as magenta, different from the colors commonly used to provide other information, such red, blue, white, or amber commonly used as hazard level indicators.

Alternative Wake Vortex Visual Symbolism

Current cockpit displays use a 2-dimensional medium (CRT or AMLCD screen) to depict 3-dimensional phenomena, therefore ancillary symbology is normally used to illustrate 3-dimensional characteristics. In the case of traffic information, the intruder aircraft's vertical position is refined by the inclusion of a number indicating the other planes relative or absolute altitude, as described above. For terrain data, elevations are shown throughout a hierarchy of textures and colors. Alternative embodiments of the present invention create a methodology that incorporates several features together into a readily comprehensible display to display the location and orientation of a wake vortex in 3 dimensions on a 2-dimensional screen.

Figure 8F:
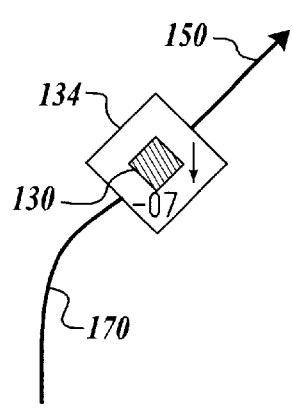
FIG. 8F illustrates one alternative embodiment of the display of the present invention showing a plan view of a wake vortex wherein the wake vortex is displayed as a "tail" which is colored according to degree of threat.

According to one alternative embodiment of the present invention, the horizontal position of the wake vortex is shown as a "tail" and is illuminated in one of the colors commonly used to display danger or threat to one's own aircraft, such as red, amber, or magenta, because wake vortex represents a real threat to the aircraft. According to one alternative embodiment, the color of the vortex icon changes as function of level of threat, wherein threat level is derived from characteristics such as relative velocity, flight path, and vortex intensity. FIG. 8F is a depiction of intruder 130 with a horizontal "tail" depiction of intruder's wake vortex 170.

Figure 8G:
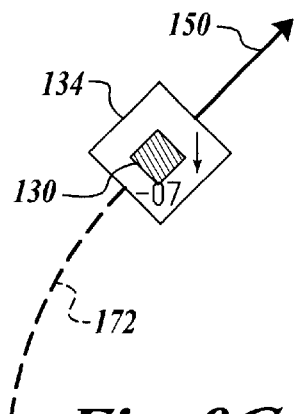
FIG. 8G shows display symbology describing relative strength of a wake vortex behind the threat aircraft according to one embodiment of the present invention.
Figure 8H:
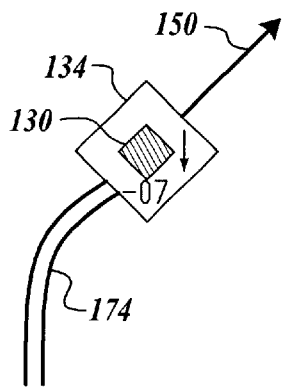
FIG. 8H shows display symbology describing a wake of relatively stronger intensity according to one embodiment of the present invention.

The icon 170 used to depict the horizontal position of the vortex alternatively includes additional information, such as the length or intensity of the vortex. This additional information is relayed through the use of additional features, such as the texture or composition of vortex icon 170. Examples include the wake vortex intensity shown in FIGS. 8G and 8H. In FIG. 8G, the intruder's wake vortex is displayed using dashes 172 to illustrate a relatively weak intensity wake vortex resulting intruder 130 is a light weight aircraft. FIG. 8H illustrates a relatively strong intensity wake vortex through the use of double lines 174. Optionally, "dashed" wake vortex icon 172 of FIG. 8G indicates a first or weak level of intensity, the single "tail" icon 170 of FIG. 8F indicates a second or moderate level of intensity, and the double "tail" icon 174 of FIG. 8H indicates a third or relatively strong level of intensity. Those of ordinary skill in the art will recognize that by thus varying the quality and/or quantity of the wake vortex icon, different levels of wake vortex intensity are displayed clearly and unambiguously to the operator. Therefore, variations on the theme are contemplated by the invention and are considered within the scope of the claims herein.

Wake vortices are almost never purely 2-dimensional objects existing in a purely horizontal plane. A wake vortex may extend for over 20 miles behind the aircraft that creates it, and tends to drift both vertically and horizontally. Therefore, symbologies that illustrate the three-dimensional nature of a wake vortex are desirable. Thus, according to additional alternative embodiments of the invention, icons indicate either the relative or absolute attitude of the vortex. For example, symbols such as '+', 'o' and '−' are used to indicate that a given portion of the wake vortex is above, co-altitude with, below the elevation of the host aircraft.

Figure 8I:
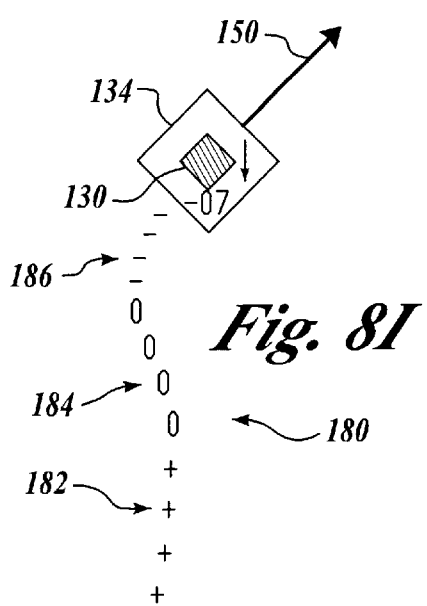
FIG. 8I depicts wake vortex relative altitude display symbology according to an embodiment of the present invention.

The definition of "co-altitude" as used herein preferably includes a buffer of a predetermined elevation above and below the elevation of the host aircraft. For example, the buffer zone may extend for several hundred feet above and below the elevation of the host aircraft. The invention also contemplates the use of other symbols to illustrate the vertical position of the vortex, either as an absolute altitude or relative to the host aircraft. FIG. 8I illustrates such wake vortex altitude symbology. In the example illustrated in FIG. 8I, the path 180 of intruder 130 is descending as indicated by the displayed "+" symbols 182 trailing furthest behind intruder 130 which indicate that the earliest created wake vortex is above the elevation of the host aircraft. The higher elevation "+" icons 182 give way to a display of co-altitude "0" icons 184, which indicate that the wake vortex created by intruder aircraft 130 is located within a buffer zone extending a predetermined elevation above and below the host aircraft at an intermediate distance behind the present position of intruder aircraft 130. The lower elevation "−" wake vortex icons 186 immediately behind intruder aircraft 130 indicate that the wake vortex is below the current elevation of the host aircraft. Thus, at a glance the pilot determines that the wake vortex of the icon 130 aircraft is descending relative to the host aircraft's elevation.

Figure 8J:
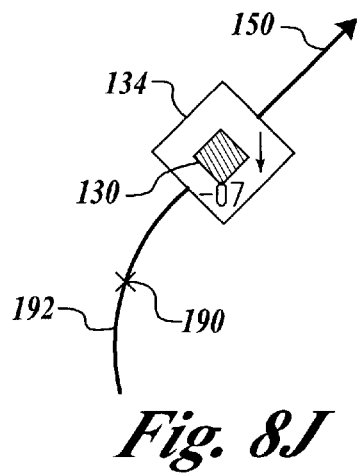
FIG. 8J shows an alternate depiction of wake vortex relative altitude according to another embodiment of the present invention.

FIG. 8J illustrates that, according to still other alternative embodiments, additional relative or absolute altitude information is appended to the vortex icon in the form of a numerical value. When combined with the relative altitude information used display TCAS traffic intruders, this attitude information is an easily interpreted extension of the TCAS symbology of the prior art. FIG. 8J illustrates visual symbology describing a wake vortex extending from behind the icon 130 intruder, wherein the wake vortex is currently located 700 feet below the host aircraft, down from an altitude 800 feet above the host aircraft at its extreme tail. A marker 190, for example a "−" or "X" symbol, crossing wake vortex icon 192 illustrates an point at which the vortex is located at a co-altitude with the host aircraft, within the predetermined buffer zone.

Thus, the present invention includes any methodology that illustrates the horizontal location and relative intensity of a wake vortex through the use of onscreen iconic symbology, and further includes any methodology that illustrates the vertical location of a wake vortex, especially one inclined relative to the horizontal plane, through the use of differentiating symbology.

Parallel Approaches

During parallel approaches the aircrew must have accurate, real-time information about the motion of the other approaching aircraft relative to the host aircraft. The invention supplies such relative motion information is visual form, including relative drift rates and angles. The technology necessary to support parallel approaches includes the ability to display accurate, real-time predicted wake vortex information of the lead aircraft relative to the host aircraft. According to various embodiments of the invention described below, the position of the lead aircraft relative to the host aircraft is assumed based on historical relative motion of the two aircraft. The length of the lead aircraft's wake vortex is computed as a function of the lead aircraft's speed, as described above. During parallel approaches each aircraft must have "safe" airspace in which to maneuver. Parallel runways are located from information available at least through either the aircraft's Global Positioning System (GPS) or Flight Management System (FMS). The TCAS preferably contains a look-up table of zones of such "safe" airspace associated with each individual airport with which to derive the airspace that an aircraft uses landing on any given runway. Such "safe" zones are alternatively inferred from local runway information provided by the EGPWS based on an airport database. Preferably, the invention displays unambiguous visual symbology defining such "safe" airspace. Preferably, the invention also generates an alert during encroachment of the "safe" airspace. Such safe airspace encroachment alerts are, for example, generated in a fashion similar to the traffic alerts and resolution advisories typical of the TCAS.

Figure 9A:
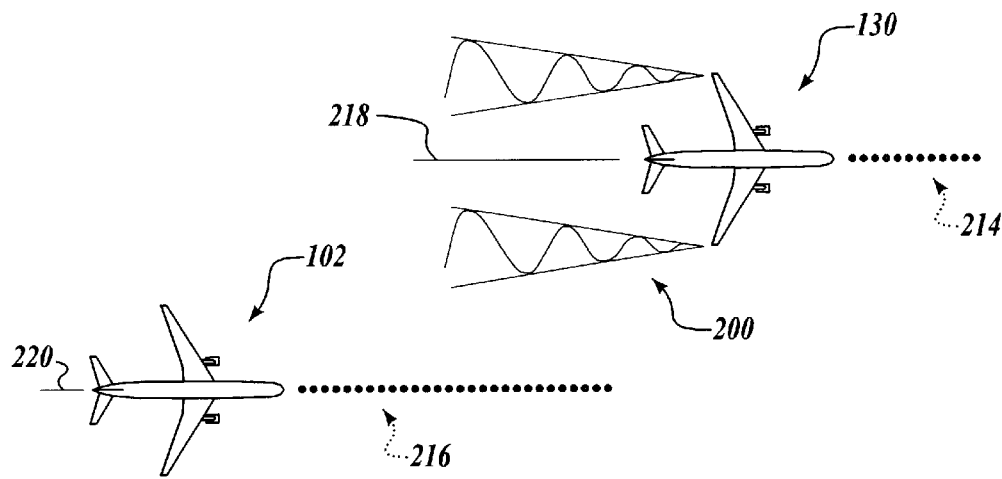
FIG. 9A illustrates the wake vortex of a lead aircraft relative to the host aircraft.

FIG. 9A illustrates the wake vortex 200 from a lead aircraft 130 relative to the host aircraft 102. Dotted lines 214 and 216 represent the flight path of lead aircraft 130 and host aircraft 102, respectively, while solid lines 218 and 220 represent the respective paths flown.

Figure 9B:
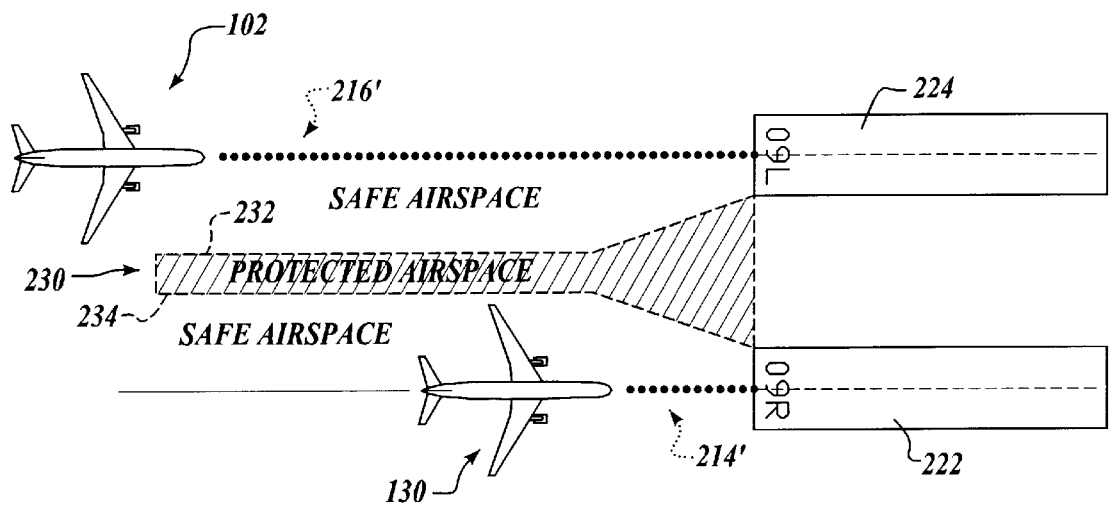
FIG. 9B illustrates respective flight paths of a lead aircraft and the host aircraft during a parallel approach, including the zone of "protected" airspace separating the "safe" airspace allotted to each aircraft.

FIG. 9B illustrates flight paths 214' and 216' of lead aircraft 130 and host aircraft 102, respectively, while approaching respective parallel runways 222 and 224. In FIG. 9B, "safe" airspace in which to maneuver during a parallel approach is provided for each aircraft in areas separated by a zone of "protected" airspace, represented by cross-hatched area 230. Dashed "foul" lines 232, 234 bounding the protected airspace between the two aircraft define each aircraft's "safe" area.

Figure 10A:
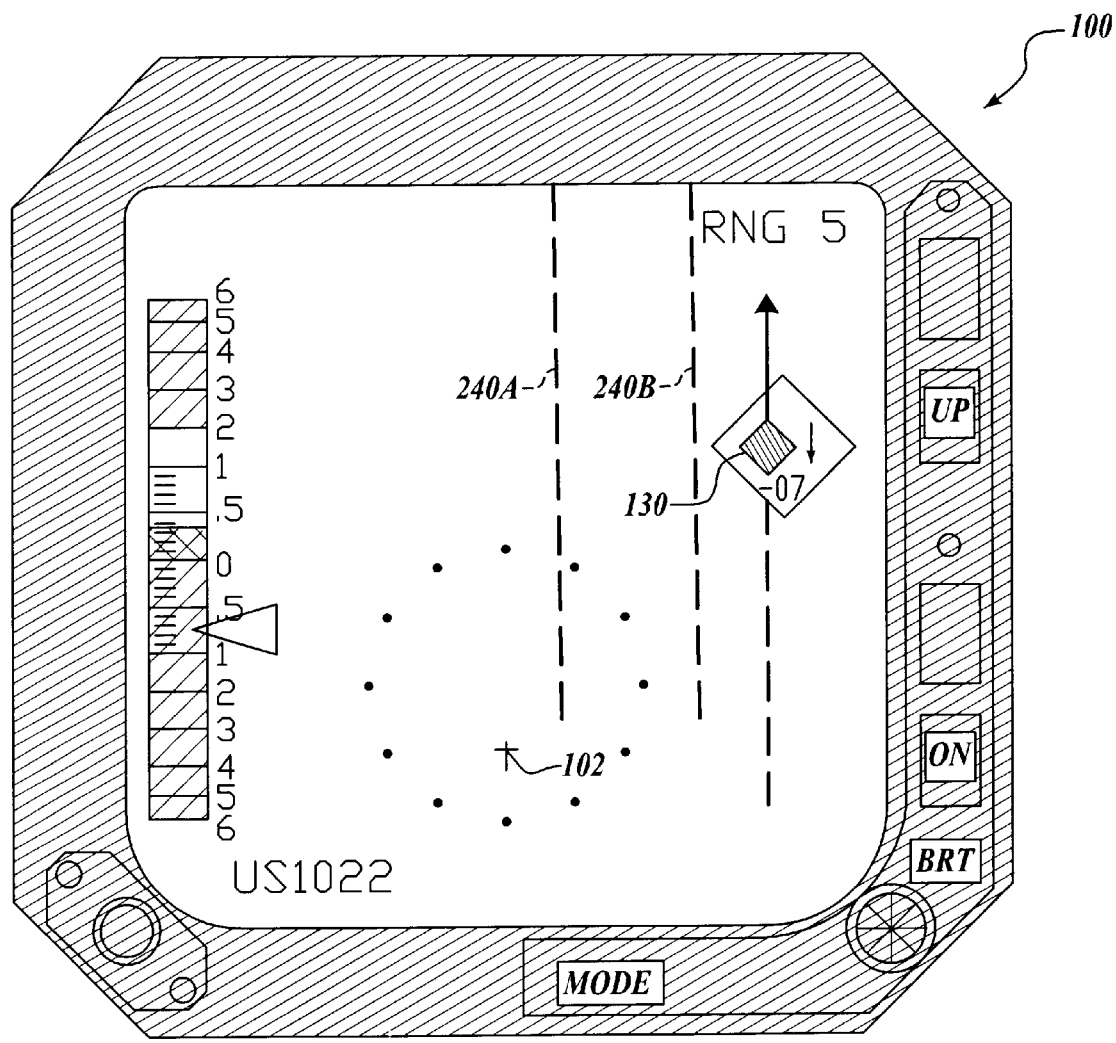
FIG. 10A illustrates one embodiment of the visual symbology of the present invention describing the zone of "protected" airspace separating the respective "safe" airspace allocated to each of a lead aircraft and the host aircraft, as shown in FIG. 6.
Figure 10B:
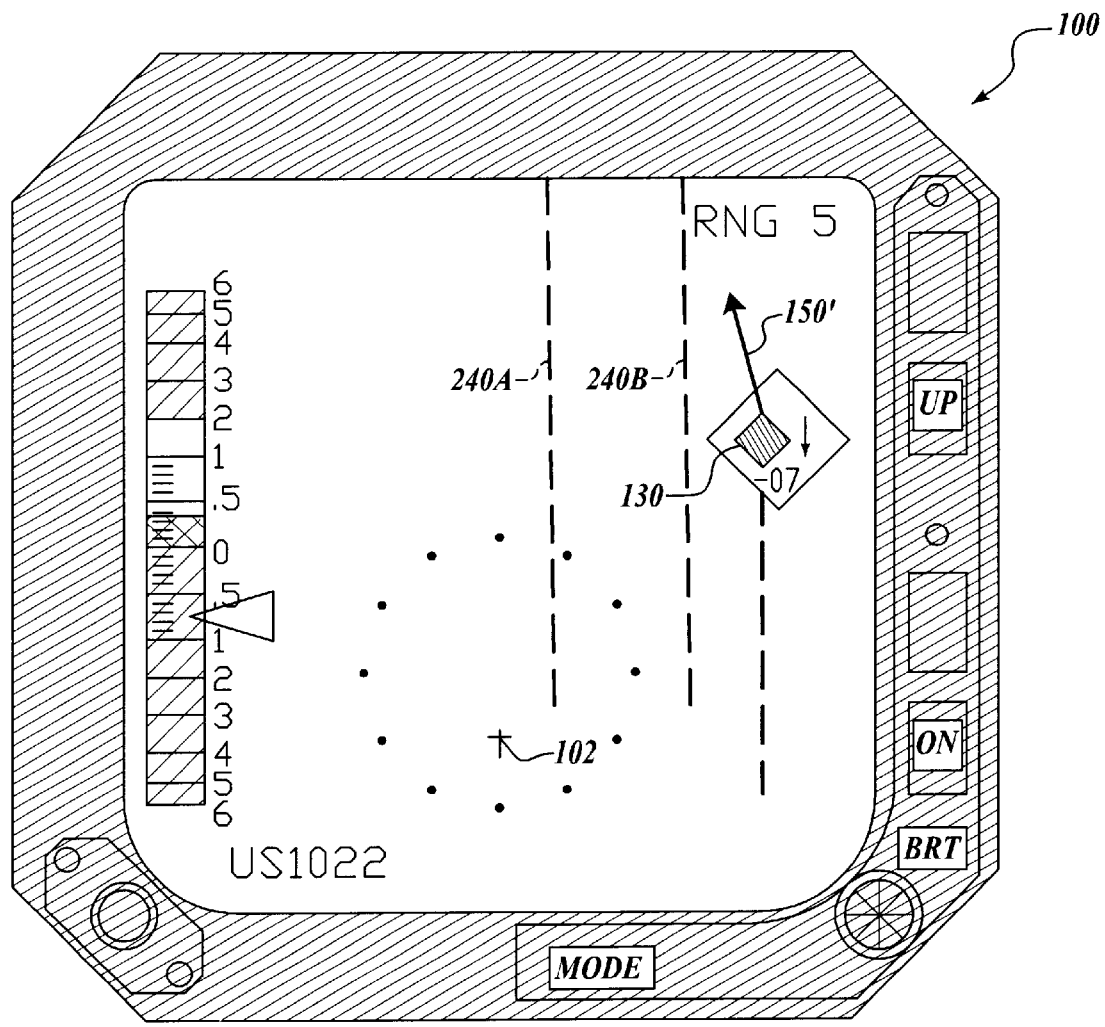
FIG. 10B illustrates one embodiment of the visual symbology of the present invention describing the response to a probable incursion within a predetermined time period of the zone of "protected" airspace separating the respective "safe" airspace allocated to each of a lead aircraft and the host aircraft.
Figure 10C:
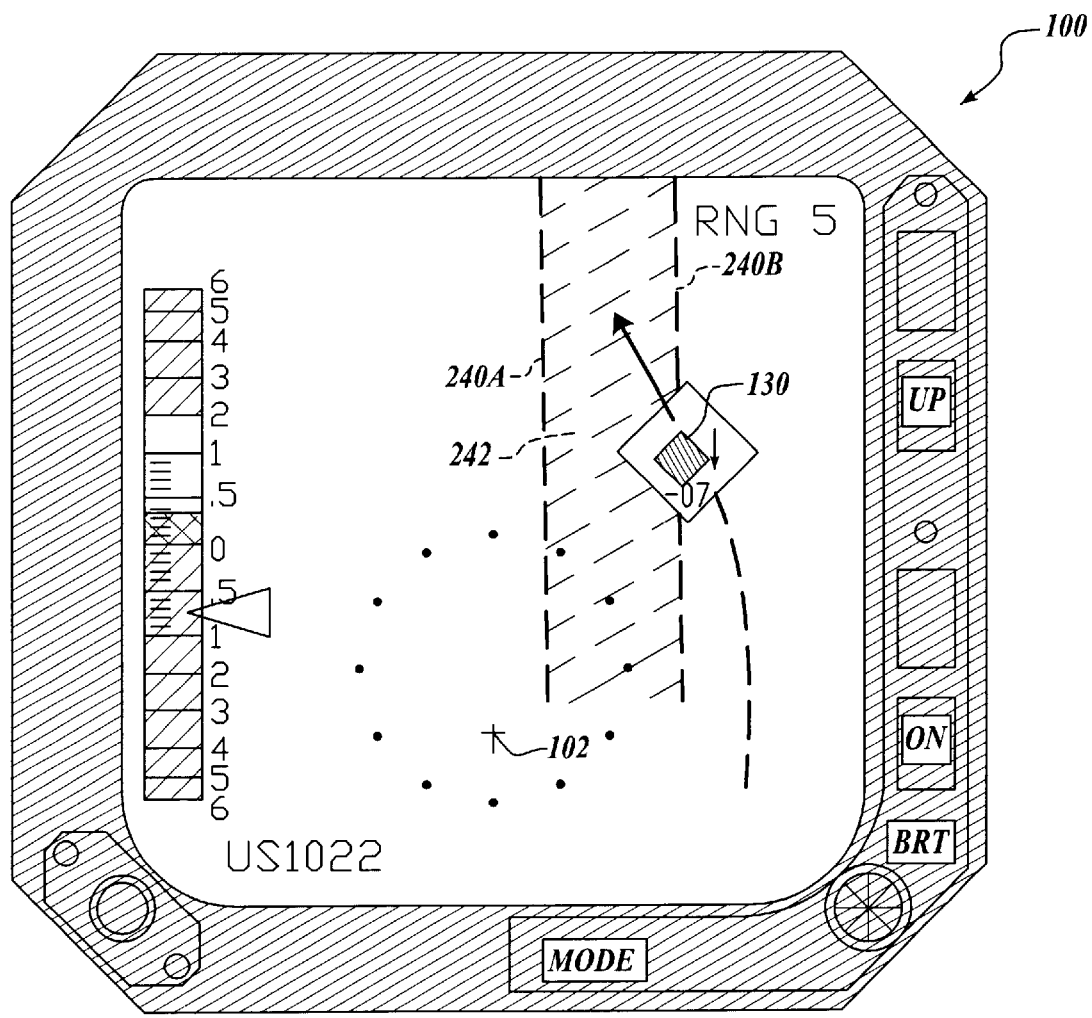
FIG. 10C illustrates one embodiment of the visual symbology of the present invention describing the response to an actual incursion into the zone of "protected" airspace separating the respective "safe" airspace allocated to each of a lead aircraft and the host aircraft.

FIGS 10A, 10B and 10C illustrate the visual symbology representing "protected" airspace 230, shown in FIG. 6, between aircraft during a parallel approach. The series of FIGS. 10A, 10B and 10C illustrate the functioning of the wake vortex indications of the invention. Briefly, the visual symbology includes two essentially parallel lines defining "safe" zones for each approaching aircraft, the two lines changing in color one or more times to display higher hazard levels. FIG. 10A illustrates one embodiment of the visual symbology used to indicate zone of "protected" airspace 230 separating the respective "safe" airspace allocated to each of lead aircraft 130 and host aircraft 102, as shown in FIG. 7. In FIG. 10A two "foul" lines 240A and 240B, for example, colored dashed lines, depict the respective edges of "protected" airspace 230 between the two aircraft. While the two aircraft maintain "protected" zone 230, the "foul" lines 240A and 240B are preferably displayed using a neutral color (not shown) which normally elicits a nonthreatening response rather than a cautionary or threatening one. For example, while the targeted lead aircraft 130 flies a parallel flight path with host aircraft 102, "protected" zone 230 between the aircraft is maintained without threat. Thus, "foul" lines 240A and 240B are displayed using a neutral, nonthreatening white color (not shown) on the normally dark colored screen of display 100.

The flown paths of both host aircraft 102 and selected lead aircraft 130 are tracked and the respective flight paths are predicted by the TCAS based on their respective velocity and trend vectors, as described above. When either host aircraft 102 or lead aircraft 130 threatens to violate "protected" zone 230, an alert is generated. For example, when the predicted flight path of either aircraft indicates that "protected" zone 230 will be violated within a predetermined time limit an alert such as a change in the coloring "foul" lines 240A and 240B is displayed and/or a meaningful and unambiguous audible warning is generated. FIG. 10B illustrates a situation in which selected lead aircraft 130 drifts toward "protected" zone 230 between the aircraft and incursion is probable within a predetermined time limit, such as 10 seconds. According to one embodiment of the invention, displayed "foul" lines 240A and 240B change from neutral and nonthreatening color to a cautionary color, such as yellow. Preferably, an audible warning such as "closing" or "protected" or another suitable term is also generated. Properly, the pilot of lead aircraft 130 threatening "protected" zone 230 responsively adjusts course to maintain separation.

FIG. 10C illustrates a situation in which selected lead aircraft 130 actually violates "protected" zone 230 between the aircraft. According to one embodiment of the invention, displayed "foul" lines 240A and 240B change from cautionary color to a critical color, such as red, and an auditory warning is generated. According to another embodiment of the invention, the TCAS responds to an actual violation of "protected" zone by 1) issuing an audible warning and evasive maneuver command, such as "incursion, climb now" or another suitable warning and evasive maneuver command; 2) placing a conventional Vertical Speed Indicator (VSI) "fly to" coloration on the VSI display; and 3) highlighting "protected" zone 230 on display 100 to unambiguously indicate a critical condition, such highlighting including filling the display area between "foul" lines 240A and 240B with multiple red colored hash marks 242 similar to conventional predictive windshear marks, or flashing "foul" lines 240A and 240B in a red color.

While the preferred embodiment of the invention has been illustrated and described, it will be appreciated that various changes can be made therein without departing from the spirit and scope of the invention. For example, delineating the selected icon is alternatively accomplished by alternating the shape of the selected icon between the shape of the icon prior to selection and another different and distinctive shape, such as a football shape, or alternatively, changing the shape of the selected icon to another different and distinctive shape, such as a football shape, during the period the icon is selected.

What is claimed is:

1. A method for using an electronic circuit to determine the wake vortex of an aircraft, the method comprising:

retrieving aircraft type information corresponding to an aircraft;

with the electronic circuit, determining elevation and position of said aircraft relative to a runway;

with the electronic circuit, predicting a configuration of said aircraft; and with the electronic circuit, predicting a location of a wake vortex corresponding to said aircraft.

2. The method recited in claim 1, further comprising: with the electronic circuit, predicting a trajectory of said wake vortex.

3. The method recited in claim 2, wherein said aircraft further comprises an intruder aircraft; and further comprising:

with the electronic circuit, developing a current trajectory of a host aircraft; and with the electronic circuit, determining whether said current trajectory of said host aircraft intersects said predicted wake vortex trajectory.

4. The method recited in claim 3, wherein said predicting a trajectory of said wake vortex further comprises:

retrieving local atmospheric information; and applying said local atmospheric information to said predicting a trajectory of said wake vortex.

5. The method recited in claim 3, further comprising displaying a visual representation of said wake vortex.

6. The method recited in claim 5, further comprising generating an alert if said current trajectory of said host aircraft intersects said predicted wake vortex trajectory.

7. The method recited in claim 5, further comprising predicting one or more of an intensity and an extent of said wake vortex; and wherein said displaying a visual representation of said wake vortex further comprises displaying a visual representation of one or more of said intensity and said extent.

8. A method for predicting an intersection of a host aircraft flight path with the wake vortex of another aircraft, the method comprising:

retrieving aircraft type information corresponding to another aircraft;

retrieving a position of said other aircraft relative to a local airport;

determining an elevation above terrain of said other aircraft;

predicting a configuration of said other aircraft; and applying said position, said aircraft type information, said elevation above terrain, and said configuration of said other aircraft to an algorithm for predicting a location of a wake vortex of said other aircraft.

9. The method recited in claim 8, further comprising:
retrieving a position and flight path of a host aircraft;
determining a position of said other aircraft relative to said host aircraft; and
determining whether said flight path of said host aircraft passes through said wake vortex.

10. The method recited in claim 9, further comprising:
determining local atmospheric condition information; and
further applying said atmospheric condition information to said wake vortex location predicting algorithm.

11. The method recited in claim 10, wherein said predicting a configuration of said other aircraft further comprises applying said position of said other aircraft relative to a local airport and said elevation above terrain of said other aircraft to an algorithm for predicting a configuration of said other aircraft.

12. The method recited in claim 11, further comprising one or more of displaying a representation of said wake vortex on a display onboard said host aircraft, and generating an alert onboard said host aircraft when said flight path of said host aircraft passes through said wake vortex.

13. A circuit implementing a method for predicting an intersection of a host aircraft flight path with the wake vortex of another aircraft, the circuit comprising:
a function for retrieving aircraft type information corresponding to another aircraft;
a function for retrieving a position of said other aircraft relative to a local airport;
a function for determining an elevation above terrain of said other aircraft;
a function for predicting a configuration of said other aircraft; and
a function for predicting a location of a wake vortex of said other aircraft, said function coupled to receive the output of each of said function for retrieving aircraft type information, said function for retrieving a position of said other aircraft, said funtion for determining an elevation above terrain, and said function for predicting a configuration of said other aircraft.

14. The circuit recited in claim 13, further comprising an air traffic alert and collision avoidance system coupled thereto.

15. The circuit recited in claim 14, further comprising a display coupled to said circuit for receiving an output of said function for predicting a location of a wake vortex, said display displaying a visual representation of said wake vortex.

16. The circuit recited in claim 15, further comprising a function for determining the trajectory of a host aircraft relative to said wake vortex location.

17. The circuit recited in claim 16, further comprising a function for predicting an intersection of said host aircraft and said wake vortex.

18. The circuit recited in claim 17, further comprising a function for generating an alert signal as a function of said intersection of said host aircraft and said wake vortex.

19. A method for using an electronic circuit to determine the wake vortex of an aircraft, the method comprising:
retrieving aircraft type information corresponding to an aircraft;
with the electronic circuit, determining elevation and position of said aircraft relative to a runway;
with the electronic circuit, predicting a configuration of said aircraft;
with the electronic circuit, predicting a location of a wake vortex corresponding to said aircraft;
with the electronic circuit, predicting a trajectory of said wake vortex wherein said aircraft further comprises an intruder aircraft; and further comprising;
with the electronic circuit, developing a current trajectory of a host aircraft;
with the electronic circuit, determining whether said current trajectory of said host aircraft intersects said predicted wake vortex trajectory; and
with the electronic circuit recording a predicted intensity and a predicted extent of said wake vortex.

* * * * *